(12) United States Patent
Lane

(10) Patent No.: US 11,374,436 B2
(45) Date of Patent: Jun. 28, 2022

(54) WIRELESS TRANSMISSION OF ENERGY THROUGH LASER-INDUCED PLASMA FILAMENTS IN ATMOSPHERE

(71) Applicant: Glenn Lane Family Limited Liability Limited Partnership, Summerfield, FL (US)

(72) Inventor: Glenn E. Lane, Summerfield, FL (US)

(73) Assignee: GLENN LANE FAMILY LIMITED LIABILITY LIMITED PARTNERSHIP, Summerfield, FL (US)

( * ) Notice: Subject to any disclaimer, the term of this patent is extended or adjusted under 35 U.S.C. 154(b) by 205 days.

(21) Appl. No.: 16/620,263

(22) PCT Filed: Jun. 11, 2018

(86) PCT No.: PCT/US2018/036946
§ 371 (c)(1),
(2) Date: Dec. 6, 2019

(87) PCT Pub. No.: WO2018/227201
PCT Pub. Date: Dec. 13, 2018

(65) Prior Publication Data
US 2021/0099020 A1    Apr. 1, 2021

Related U.S. Application Data

(60) Provisional application No. 62/517,625, filed on Jun. 9, 2017.

(51) Int. Cl.
*H02J 50/30*    (2016.01)
*H02J 50/40*    (2016.01)

(52) U.S. Cl.
CPC ............ *H02J 50/30* (2016.02); *H02J 50/402* (2020.01)

(58) Field of Classification Search
None
See application file for complete search history.

(56) References Cited

U.S. PATENT DOCUMENTS

| | | | |
|---|---|---|---|
| 3,916,246 A * | 10/1975 | Preist | H02J 50/30 315/5 |
| 6,154,038 A | 11/2000 | Ito et al. | |
| 6,377,436 B1 | 4/2002 | Margolin | |
| 2012/0114007 A1* | 5/2012 | Jones | G02F 1/3511 372/51 |
| 2014/0034820 A1* | 2/2014 | Fattal | G01J 1/0407 250/237 G |
| 2014/0291545 A1 | 10/2014 | Lane | |
| 2016/0020651 A1* | 1/2016 | Lane | H02J 50/80 307/104 |
| 2016/0025960 A1* | 1/2016 | Theberge | G02B 19/0023 359/365 |

FOREIGN PATENT DOCUMENTS

CN    103326478 A    9/2013

* cited by examiner

*Primary Examiner* — Jared Fureman
*Assistant Examiner* — Joel Barnett
(74) *Attorney, Agent, or Firm* — Saliwanchik, Lloyd & Eisenschenk

(57) ABSTRACT

A multi-port laser device used to create multiple laser induced plasma filaments positioned in a useful position in spatial relationship to another filament or filaments, such as interconnecting with each other.

20 Claims, 50 Drawing Sheets

| | Filament Starting Coordinates (in Meters) | | |
|---|---|---|---|
| | X | Y | Z |
| 1 | 0 | 7.5 | 0 |
| 2 | 3.169 | -1.249 | 38.903 |
| 3 | -1.254 | -2.525 | 78.637 |
| 4 | -1.891 | 0 | 118.552 |
| END POINT | 0 | 0 | 158.507 |

4 PORT

FIG. 13A

ISO view
no beams

4 Port
ISO View
No beams

ISO view
4 Port ISO view

Filament Starting Coordinates (in Meters)

| | X | Y | Z |
|---|---|---|---|
| 1 | 0 | 7.5 | 0 |
| 2 | 4.248 | 0.428 | 39.14 |
| 3 | 1.311 | -1.496 | 78.986 |
| 4 | -0.253 | 0.814 | 118.888 |
| 5 | 1.142 | 3.124 | 158.797 |
| 6 | 3.223 | 3.327 | 198.742 |
| 7 | 3.87 | -0.016 | 238.597 |
| 8 | 2.551 | -2.724 | 278.484 |
| 9 | 0.191 | -4 | 318.394 |
| 10 | -2.17 | -3.726 | 358.323 |
| 11 | -3.723 | -2.338 | 398.269 |
| 12 | -4.096 | -0.566 | 438.228 |
| 13 | -3.398 | 0.858 | 478.196 |
| 14 | -2.092 | 1.447 | 518.17 |
| 15 | -0.786 | 1.081 | 558.147 |
| END POINT | 0 | 0 | 598.125 |

15 Port

FIG. 18A

15 Port Side View

Side View

Filament Starting Coordinates (in Meters)
DUAL BEAM (ODDS/EVENS)

|  | X | Y | Z |
|---|---|---|---|
| 1 | 0.000 | 20.000 | 0.000 |
| 2 | 4.158 | 19.563 | 0.000 |
| 3 | 9.361 | 10.558 | 37.726 |
| 4 | 11.351 | 8.381 | 37.726 |
| 5 | 10.663 | 2.550 | 76.895 |
| 6 | 10.931 | 0.284 | 76.895 |
| 7 | 8.458 | -3.021 | 116.446 |
| 8 | 7.645 | -4.714 | 116.446 |
| 9 | 4.855 | -6.160 | 156.159 |
| 10 | 3.469 | -7.035 | 156.159 |
| 11 | 1.023 | -7.197 | 195.962 |
| 12 | -0.495 | -7.252 | 195.962 |
| 13 | -2.292 | -6.627 | 235.820 |
| 14 | -3.619 | -6.005 | 235.820 |
| 15 | -4.668 | -5.010 | 275.717 |
| 16 | -5.608 | -3.930 | 275.717 |
| 17 | -5.946 | -2.903 | 315.641 |
| 18 | -6.420 | -1.603 | 315.641 |
| 19 | -6.173 | -0.795 | 355.584 |
| 20 | -6.203 | 0.506 | 355.584 |
| 21 | -5.545 | 0.934 | 395.542 |
| 22 | -5.230 | 2.067 | 395.542 |
| 23 | -4.355 | 2.039 | 435.509 |
| 24 | -3.836 | 2.900 | 435.509 |
| 25 | -2.930 | 2.418 | 475.482 |
| 26 | -2.363 | 2.974 | 475.482 |
| 27 | -1.577 | 2.102 | 515.458 |
| 28 | -1.105 | 2.384 | 515.458 |
| 29 | -0.546 | 1.227 | 555.435 |
| 30 | -0.279 | 1.314 | 555.435 |
| END POINT | 0.000 | 0.000 | 595.412 |

30 Port  FIG. 25A

Front View

30 Port Front View

Side View
15 degree tilt

30 Port
Side View
15° tilt

30 Port Side View

Side View

Filament Starting Coordinates (in Meters)

| A Filament | X | Y | Z |
|---|---|---|---|
| A1 | 0.000 | 20.000 | 0.000 |
| A2 | 10.337 | -0.356 | 32.845 |
| A3 | 0.297 | -7.913 | 70.819 |
| A4 | -6.050 | -3.334 | 110.046 |
| A5 | -3.993 | 1.297 | 149.724 |
| END POINT | 0.000 | 0.000 | 189.503 |

| B Filament | X | Y | Z |
|---|---|---|---|
| B1 | 20.000 | 0.000 | 0.000 |
| B2 | -0.356 | -10.337 | 32.845 |
| B3 | -7.913 | -0.297 | 70.819 |
| B4 | -3.334 | 6.050 | 110.046 |
| B5 | 1.297 | 3.993 | 149.724 |
| END POINT | 0.000 | 0.000 | 189.503 |

| C Filament | X | Y | Z |
|---|---|---|---|
| C1 | 0.000 | -20.000 | 0.000 |
| C2 | -10.337 | 0.356 | 32.845 |
| C3 | -0.297 | 7.913 | 70.819 |
| C4 | 6.050 | 3.334 | 110.046 |
| C5 | 3.993 | -1.297 | 149.724 |
| END POINT | 0.000 | 0.000 | 189.503 |

| D Filament | X | Y | Z |
|---|---|---|---|
| D1 | -20.000 | 0.000 | 0.000 |
| D2 | 0.356 | 10.337 | 32.845 |
| D3 | 7.913 | 0.297 | 70.819 |
| D4 | 3.334 | -6.050 | 110.046 |
| D5 | -1.297 | -3.993 | 149.724 |
| END POINT | 0.000 | 0.000 | 189.503 |

20 Port

FIG. 30A

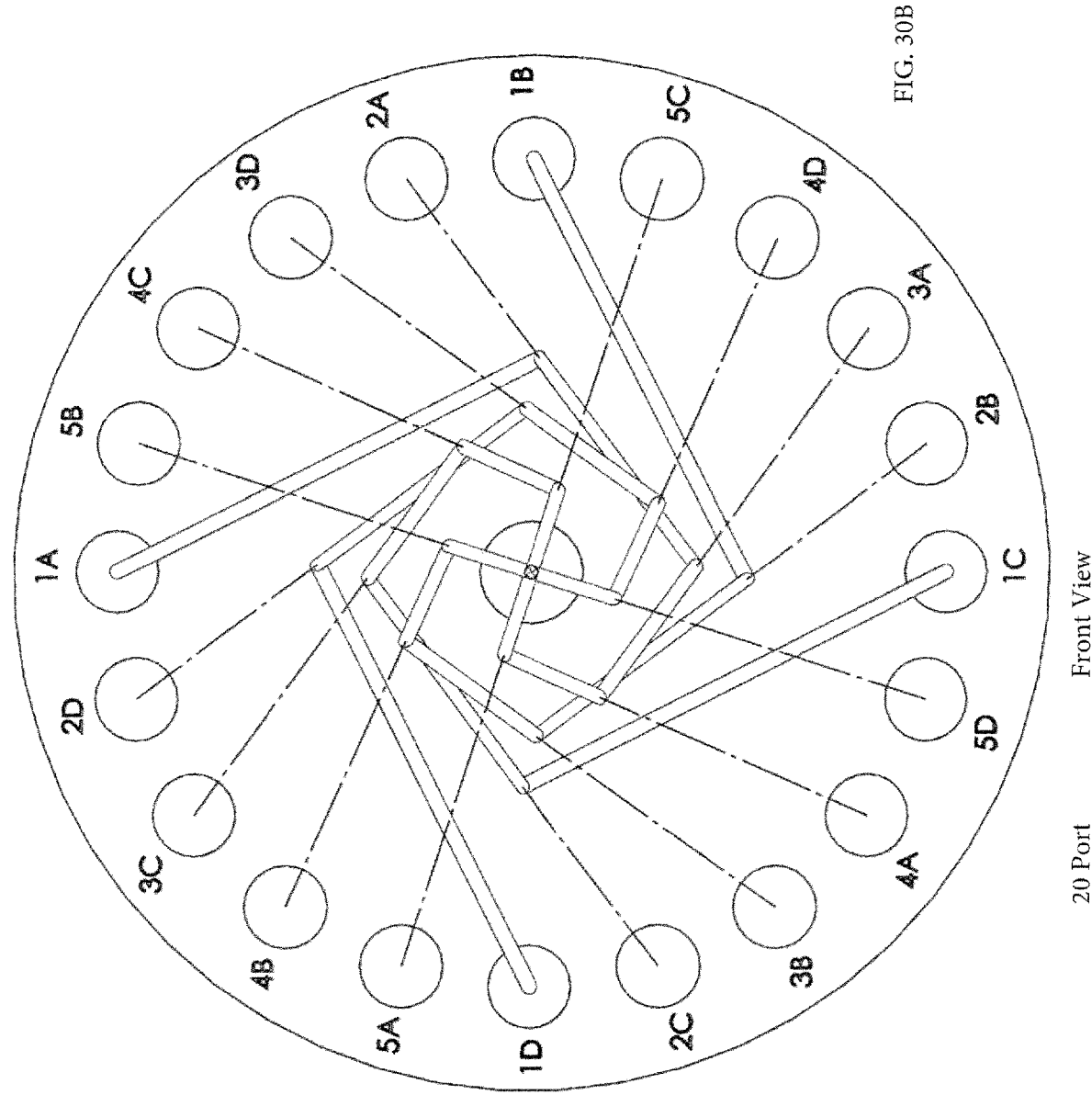

20 Port ISO view No Beams

20 Port    ISO View

ISO view

Filament Starting Coordinates (in Meters)

| A Filament | X | Y | Z | C Filament | X | Y | Z |
|---|---|---|---|---|---|---|---|
| A1 | 0.000 | 22.000 | 0.000 | C1 | 0.000 | -22.000 | 0.000 |
| A2 | 11.242 | 8.959 | 36.104 | C2 | -11.242 | -8.959 | 36.104 |
| A3 | 10.544 | -1.267 | 74.769 | C3 | -10.544 | 1.267 | 74.769 |
| A4 | 5.567 | -6.738 | 114.079 | C4 | -5.567 | 6.738 | 114.079 |
| A5 | -0.057 | -7.990 | 153.662 | C5 | 0.057 | 7.990 | 153.662 |
| A6 | -4.371 | -6.331 | 193.394 | C6 | 4.371 | 6.331 | 193.394 |
| A7 | -6.548 | -3.288 | 233.219 | C7 | 6.548 | 3.288 | 233.219 |
| A8 | -6.607 | -0.240 | 273.102 | C8 | 6.607 | 0.240 | 273.102 |
| A9 | -5.143 | 1.831 | 313.022 | C9 | 5.143 | -1.831 | 313.022 |
| A10 | -3.021 | 2.464 | 352.961 | C10 | 3.021 | -2.464 | 352.961 |
| A11 | -1.098 | 1.708 | 392.907 | C11 | 1.098 | -1.708 | 392.907 |
| END POINT | 0.000 | 0.000 | 432.856 | END POINT | 0.000 | 0.000 | 432.856 |

| B Filament | X | Y | Z | D Filament | X | Y | Z |
|---|---|---|---|---|---|---|---|
| B1 | 22.000 | 0.000 | 0.000 | D1 | -22.000 | 0.000 | 0.000 |
| B2 | 8.959 | -11.242 | 36.104 | D2 | -8.959 | 11.242 | 36.104 |
| B3 | -1.267 | -10.544 | 74.769 | D3 | 1.267 | 10.544 | 74.769 |
| B4 | -6.738 | -5.567 | 114.079 | D4 | 6.738 | 5.567 | 114.079 |
| B5 | -7.990 | 0.057 | 153.662 | D5 | 7.990 | -0.057 | 153.662 |
| B6 | -6.331 | 4.371 | 193.394 | D6 | 6.331 | -4.371 | 193.394 |
| B7 | -3.288 | 6.548 | 233.219 | D7 | 3.288 | -6.548 | 233.219 |
| B8 | -0.240 | 6.607 | 273.102 | D8 | 0.240 | -6.607 | 273.102 |
| B9 | 1.831 | 5.143 | 313.022 | D9 | -1.831 | -5.143 | 313.022 |
| B10 | 2.464 | 3.021 | 352.961 | D10 | -2.464 | -3.021 | 352.961 |
| B11 | 1.708 | 1.098 | 392.907 | D11 | -1.708 | -1.098 | 392.907 |
| END POINT | 0.000 | 0.000 | 432.856 | END POINT | 0.000 | 0.000 | 432.856 |

44 Port      FIG. 35A

FIG. 35B Front View 44 Port

44 Port
ISO View
No Beams

44 Port
ISO View

44 Port Side View

Filament Starting Coordinates (in Meters)

| A Filament | X | Y | Z | C Filament | X | Y | Z |
|---|---|---|---|---|---|---|---|
| A1 | 0.000 | 11.000 | 0.000 | C1 | 0.000 | -11.000 | 0.000 |
| A2 | 3.907 | -3.043 | 37.250 | C2 | -3.907 | 3.043 | 37.250 |
| A3 | -2.047 | -0.439 | 76.718 | C3 | 2.047 | 0.439 | 76.718 |
| A4 | 1.825 | 2.181 | 116.444 | C4 | -1.825 | -2.181 | 116.444 |
| A5 | 1.035 | -2.438 | 156.179 | C5 | -1.035 | 2.438 | 156.179 |
| A6 | -1.587 | -0.061 | 196.027 | C6 | 1.587 | 0.061 | 196.027 |
| A7 | 1.235 | 0.770 | 235.919 | C7 | -1.235 | -0.770 | 235.919 |
| A8 | -0.247 | -2.028 | 275.793 | C8 | 0.247 | 2.028 | 275.793 |
| A9 | -1.730 | 0.185 | 315.705 | C9 | 1.730 | -0.185 | 315.705 |
| A10 | 0.581 | 0.209 | 355.638 | C10 | -0.581 | -0.209 | 355.638 |
| A11 | -1.100 | -1.514 | 395.565 | C11 | 1.100 | 1.514 | 395.565 |
| A12 | -1.786 | 0.479 | 435.510 | C12 | 1.786 | -0.479 | 435.510 |
| END POINT | 0.000 | 0.000 | 475.467 | END POINT | 0.000 | 0.000 | 475.467 |

| B Filament | X | Y | Z | D Filament | X | Y | Z |
|---|---|---|---|---|---|---|---|
| B1 | 11.000 | 0.000 | 0.000 | D1 | -11.000 | 0.000 | 0.000 |
| B2 | -3.043 | -3.907 | 37.250 | D2 | 3.043 | 3.907 | 37.250 |
| B3 | -0.439 | 2.047 | 76.718 | D3 | 0.439 | -2.047 | 76.718 |
| B4 | 2.181 | -1.825 | 116.444 | D4 | -2.181 | 1.825 | 116.444 |
| B5 | -2.438 | -1.035 | 156.179 | D5 | 2.438 | 1.035 | 156.179 |
| B6 | -0.061 | 1.587 | 196.027 | D6 | 0.061 | -1.587 | 196.027 |
| B7 | 0.770 | -1.235 | 235.919 | D7 | -0.770 | 1.235 | 235.919 |
| B8 | -2.028 | 0.247 | 275.793 | D8 | 2.028 | -0.247 | 275.793 |
| B9 | 0.185 | 1.730 | 315.705 | D9 | -0.185 | -1.730 | 315.705 |
| B10 | 0.209 | -0.581 | 355.638 | D10 | -0.209 | 0.581 | 355.638 |
| B11 | -1.514 | 1.100 | 395.565 | D11 | 1.514 | -1.100 | 395.565 |
| B12 | 0.479 | 1.786 | 435.510 | D12 | -0.479 | -1.786 | 435.510 |
| END POINT | 0.000 | 0.000 | 475.467 | END POINT | 0.000 | 0.000 | 475.467 |

48 Port

FIG. 39A

48 Port
ISO View
No Beams

48 Port
ISO view

48 Port    Side View    FIG. 42

WIRELESS TRANSMISSION OF ENERGY THROUGH LASER-INDUCED PLASMA FILAMENTS IN ATMOSPHERE

CROSS-REFERENCE TO RELATED APPLICATIONS

This application is a National Stage Application of International Application PCT/US2018/036946, filed Jun. 11, 2018; which claims the benefit of U.S. provisional application Ser. No. 62/517,625, filed Jun. 9, 2017, which are incorporated herein by reference in their entirety.

FIELD OF THE INVENTION

The present invention relates to the transmission of energy through laser-induced plasma channels (Filaments) in Earth's atmosphere or other medium.

BACKGROUND OF THE INVENTION

High energy ultra-short non-linear laser pulses are capable of ionizing the atmosphere. The self-focusing nature of this type of photonic energy exceeds a critical power that initiates ionization of the medium. In the wake of the ionization is a short-lived plasma "filament" of a finite length that is a straight line, contains free electrons and is capable of conducting energy (e.g., charge flow, such as the flow of free electrons). Potential uses of plasma filaments in the atmosphere or other medium include the transmission of electricity, guiding microwaves, remote sensing, directing (and/or triggering) lightning discharge, and other useful potential applications.

Relative to the dielectric nature of the earth's atmosphere, this plasma filamentation process has motivated innovation with regard to the heretofore physical limitations of its practical usefulness. The filament's efficacious plasma lifetime is only about 10 ns. After that, air molecules recombine. There is also pertinacious difficulty in reaching meaningful lengths. Originally, only a meter or so of filament length was observed to be produced. Currently, research referenced herein model potential filament lengths of 40 to 100 meters and presumably greater lengths (e.g., a kilometer or multiple kilometers) are possible.

Additional research, referenced herein, has examined pulsewidth comparing conductivity, smoother contained plasma filaments with pico-second long pulses vs. femto-second pulses for various uses.

It is expected that continuing research will develop greater filament lengths and hotter and higher plasma densities. However long each individual filament is, it would be useful to have a multiport apparatus capable of combining the lengths of each filament by the number of laser ports employed. Equally useful, is filament structure combinations that would be available for differing uses, i.e., spectroscopy.

The fact that it is possible to establish conductive channels in the atmosphere is something that can also be observed during a lightning storm. Leaders, both positive and negative have been observed prior to the lightning and are not unlike filaments produced by intense laser pulses.

In nature, free electrons in a thunderstorm generate a high negative charge in the atmosphere and induce a positive charge, corresponding to the negative charge, along the ground. The atmosphere itself insulates the two charges from each other until a dielectric breakdown occurs and lightning follows a conductive pathway in the atmosphere to ground, thereby reducing the field voltage. The object of the present invention is to synthesize what is observable in nature, by other means.

With filamentation, we can produce the conductive pathway, albeit with notable limitations, especially with regard to the length of each individual filament. Numerous research projects are underway to extend the length and continuity of the individual filaments. For instance, dressing, or surrounding the self-focusing Gaussian beam with an annular beam, may compensate for the natural dissipative effects, to extend the length of the conductive filament. There are extremely innovative efforts designed to extend a single filament. Increasing the repetition rate of the laser itself is promising. If the repetition rates becomes fast enough to overcome the recombination effects within the filament, then the same laser could shoot repeatedly to exploit the previous filament, but population inversion pumping time will limit the number of times one can use the same laser to extend the prior filament.

An embodiment of the present invention is a multi-port apparatus, and in a preferred embodiment, also a multi-laser system that lases filaments in the atmosphere or other medium.

When generating a plasma channel, each pulse of the laser bombards the atmosphere with a measured amount of photonic energy. When this energy is increase to a certain level, electrons in the atmosphere become disassociated from their atoms, creating an ionized plasma state. Between laser pulses, the electrons begin to return back to their atoms.

The provision of a method and apparatus for controlled wireless power transfer in atmosphere would have many scientific and industrial applications. For example, a controlled atmospheric conduction path could be used to safely and repetitively control the discharge of lightning strikes before natural breakdown occurs to protect power plants, airports, launch sites, etc. Militarily, such paths can be used to send a current pulse to a distant object (for example, to destroy a target or to disable a target's electronics). Such paths can also find application in the harvesting of energy from the upper atmosphere as described more fully in applicant's co-pending U.S. patent application entitled, Charged Particle Induction From Ionosphere to Ground, filed contemporaneously with the instant application and incorporated herein in its entirety by reference. Still further, such a means of power transfer finds application in the bulk power transmission industry itself which is the context in which the subject invention is described herein.

Based on the above, it is clear that there is a need in the art to reduce reliance on wire-based energy transmission. It is also clear that in order for wireless-based energy transmission to be a viable solution it is critical that the conductive path be stabilized during energy transmission therethrough and that there be provided a means for capturing an errant charge in the event the channel though which it is traveling closes. The methods and apparatus described herein are directed to meeting these important objectives.

SUMMARY OF THE INVENTION

Embodiments of the invention utilize plasma filamentation for practical applications. The contemplated applications require more than one filament in the atmosphere or medium and that the generated second or multiple filaments are spatially located in useful positions compared to the first filament or subsequent filaments.

For the purpose of extending conductive filaments in the atmosphere, embodiments of the subject invention simply take whatever the optimum achievable length of a single filament is and join the filament at near the filament's outermost z distance from the laser source with another filament (e.g., also having the optimal length) from a separate port. The subject system can also be employed as laser repetition rates become faster, because the variety of ports and lens models give the maximum number of options for distance and filament structures. Applications include remote laser-induced breakdown spectroscopy (LIBS), transmission of electricity, microwave guide, lightning rod or collection, plasma antenna, and others.

An embodiment of the present invention is a multi-port laser system, where at least two ports propagate ultrafast intense pulsed laser output capable of Kerr self-focusing (KSF) that will produce a conductive plasma channel or "filament" in the atmosphere or other medium. The filament has free electrons, and at higher plasma densities is a conductor, which enables some exciting potential uses. In addition to being a conductor, the pulse energy can be used for spectroscopy ablation at standoff distances. While the filament itself is essentially a straight line conduit of plasma in an otherwise dielectric medium, the filament has limitations in length and is transitory. The design of the multi-port laser system allows the system to simultaneously shoot pulses to form filaments from multiple ports, where each filament connects with one or more filaments formed by pulses from other ports. Or, in the case of standoff spectroscopy, to be able to shoot pulses from different ports at different ranges or distances and then repeat according to the repetition rate of the laser.

Four factors play into the filament's position in the medium relative to the laser source. The geometric focal point of the beam, filament lasing caused by Kerr self-focusing (KSF), plasma defocusing that begins to dissipate the beam, the position of the origin of the beam from the individual port, and the original projection angle of the beam from the individual port.

The individual filament's initiating position z (distance from the laser source) will be determined by geometric focusing $z_f$. At that point, Kerr self-focusing will initiate the filament as the critical power of the laser pulse self-focuses with an intensity that ionizes the atmosphere or other medium. The geometric focal point determines where the KSF filament begins and plasma defocusing determines where the filament ends, that is the effective length of the filament. Combined with the original angle of projection, the filament now has a vector of both magnitude and direction at a distance determined individually from each port of the multi-port laser system.

Embodiments of the present invention allow the orientation in space of two or more filaments, in such a manner that complements a variety of applications. In a preferred embodiment, each port has a different lens set-up for geometric focusing, which will determine the distance from the laser source that each port initiates the filament. Filaments from different ports can be manipulated to join other filaments, or to be projected at a greater or lesser distance from other filaments.

Lensing techniques are discussed in further detail. By way of example, both fixed lenses and telescope optics, adaptive optics, and other optical techniques can be employed. For instance, port 1 of the apparatus may use a 5 mm thick, 150 mm diameter meniscus lens with a 3 m focal length to focus the laser pulse(s) output from port 1. For other ports where the focal point is at greater distances, telescope lens techniques, which may use both concave and convex lens, two or more lenses, and any number of a variety of mirrors, may be used to focus the laser output, where the focal length can be adjusted by changing the distances or setups between the lenses and/or mirrors. For each port the filament position can be changed by changing the focal model.

In an embodiment of the present invention, electricity may be transmitted through the Earth's atmosphere by synthesizing conditions similar to lightning. Specifically, a high voltage charge, a ground, and a conductive pathway are provided to connect the charge to the ground.

In the case of lightning control and/or collection, an embodiment of the invention, referenced herein as a "receiving station" is prepositioned and grounded. Sophisticated grounding systems have been developed for fixed wire transmission networks and in the protection of devices subjected to high risk failure, such as wind turbines, and can be incorporated with embodiments of the invention. These grounding systems are designed to absorb an unlimited amount of current without changing potential within the grounding material, in a wide variety of soil conditions and at different frequency intervals. Embodiments of the present "receiving station" can be similarly grounded. With a lightning storm in the requisite proximity, an embodiment of the present multi-port system simultaneously shoots laser pulses that form a connected lattice of conductive laser filaments, reaching a section of the storm, e.g., with the highest potential charge, to manufacture conductive plasma leaders back to the system's electrodes for collection.

In an embodiment of the present invention, there is both a "sending station" and a "receiving station." Both the sending station and the receiving station can be grounded, although the sending station is primarily grounded for protection in the event of fault current.

In this use of the invention, the sending station has an available high voltage charge and the receiving station is the ground. Both stations can cooperate in establishing the conductive pathway between them by simultaneously shooting pulses to create connected filament lattices to join between the two stations. The charge moves from the high voltage sending station to the optimally grounded receiving station.

In an embodiment of the present invention, laser based spectroscopic techniques such as Raman spectroscopy, laser induced breakdown spectroscopy (LIBS), terahertz spectroscopy, and laser induced fluorescence can be employed for in situ remote/standoff detection of substances by the atomic or molecular profile produced by the laser ionization of a small portion of that material, be it solid, liquid, or gas. The advantages of the multi-port design give an enhanced range of operation, such as height, width, and distance away, to complete simultaneous spectra profiles using the individual lens set ups from each port for any number of ablations to be examined by the spectrometer. In this embodiment, it is possible for a single laser, either with a high repetition rate or using beam splitting techniques, to be small enough, yet powerful enough, to be chassis mounted or hand held.

In an embodiment of the present invention, any or all of the ports of the multi-port laser system may have a second laser that acts as a bore sight. The second laser can be a visible laser or a laser only detectable by an optical sensor. The port's second laser need not be capable of KSF, but can be optically aligned with the first laser so that the vectors of KSF lasers can be established prior to their use. In this embodiment, a continuous wave (CW) laser would pass through or use the same focal model of the KSF laser port, to establish the position $z_f$, using a detector to detect the CW beam's relative positions prior to the shots (pulses) of the KSF lasers.

In an embodiment of the present invention, all ports of a stand-alone multi-port laser station are gated by a transportable optical atomic clock with systematic uncertainty of a few parts in $10^1$. Sensors for spectroscopy could be separately gated to accommodate the delay between continuum radiation and characteristic radiation. The use of double-pulsed LIBS could also be controlled by the atomic clock and may use different ports for each pulse.

In an embodiment of the present invention, two stand-alone multi-port laser stations can be used. The first stand-alone station can be used to send energy through the plasma filaments and the second stand-alone station can be used to receive the energy sent by the first station. Both stations can have separate transportable atomic clocks that have been previously synchronized. In this manner, both stations can be capable of firing KSF filaments, and at the same time aligning the vectors of each of the multiple ports involved in the transaction from both stations.

Embodiments of the subject invention relate to methods and apparatus for the wireless transmission of energy, and/or charged particles such as electrons, or microwaves along ionized conductive paths (i.e., of plasma) in a gas media such as the atmosphere, where the length of the path is practically suited (e.g., on the order of tens of meters, hundreds of meters, and/or kilometers) for electric power transmission from a power source to a remote target such as a power grid or other receiving station. Rather than providing a single conductive pathway created by a single ionizing (laser) beam over which a charge is carried, the subject transmission path is comprised of multiple intersecting conductive pathways, e.g., multiple intersecting plasma channels formed by multiple intersecting ionizing (laser) beams. The ionizing laser beams can create filaments over a certain portion of the path of the ionizing beam.

Thus, according to one aspect of the present invention there is provided a laser-induced or "laser-augured" conduction path made up of a plurality of intersecting plasma channels in atmosphere along which electrical energy may be transmitted in pulsed or preferably constant fashion. More specifically, the subject apparatus comprises at least one high power, ultra-fast (i.e., femtosecond) pulsed, "Kerr", non-linear laser in operable communication with a high energy output apparatus to accomplish initiation of at least two, and preferably many, ionizing beams which, when transmitted, intersect each other at points of intersection along a conductive path, such that each ionizing beam serves as at least one segment of the conductive path. Atmospheric conditions permitting, the conductive path need only remain open for relatively short intervals to transmit high orders of energy, however, the present invention provides for sustained transmissions as well.

Providing multiple segments of the conductive path allows a laser, or multiple lasers, to be used that can be adjusted to optimize the creation of a corresponding plasma channel over the segment of the conductive path provided by the ionizing beam of the laser, such that a plurality of laser beams, either created by splitting a single laser beam or created separately, create a corresponding plurality of plasma channel segments, and can be used to create a longer plasma channel by allowing the charge to pass from one plasma channel to another.

In a specific embodiment, a first laser beam that will create an ionizing beam segment is created and transmitted along a first path that allows for the creation of the corresponding first segment in a location such that the plurality of segments create a path toward the target, and a second ionizing beam is created and transmitted along a second path so as to intersect the first path of the first ionizing beam at a first intersection point, such that the first segment of the first ionizing beam from a location where the filamentation of the first ionizing beam is initiated, or another location where ionization begins, to the first intersection point, serves as a first segment of the conductive path. The second ionizing beam intersects the first ionizing beam in a manner that the charge traveling along the first segment of the conductive path transfers to the second segment of the conductive path, which extends from the first intersection point to the second intersection point, where the third ionizing beam intersects the second ionizing beam and the charge traveling in the second segment of the conductive path transfers to the third segment of the conductive path. For a conductive path made up of n conductive path segments, this process continues until the $n^{th}$ segment of the conductive path is created, the charge from the $(n-1)^{th}$ segment of the conductive path transfers to the $n^{th}$ segment of the conductive path and then travels to the target. In specific embodiments one or more of the ionizing beams can serve to create more than one segment of the conductive path.

Specific embodiments can incorporate one or more lasers, and one or more apparatus for producing a first laser beam surrounded by a second laser beam (dressing beam), as taught in Gunter Steinmeyer and Carsten Bree, "Extending Filamentation," Nature Photonics, Vol. 8, April 2014 (Ref. 2), which is incorporated herein in its entirety, and, in particular, including the teaching of the references cited therein, for teaching lasers, dressing laser beams, and techniques for creating plasma channels and/or extending filamentation. In particular, embodiments can utilize one or more lasers, and apparatus for producing a first laser beam with femtosecond filamentation and a second laser beam (dressing the first laser beam), to produce plasma channels in a gas medium such as atmospheric air. Embodiments can incorporate lasers, and apparatus to produce filament laser beams and dressing laser beams, as taught in Maik Scholler, et al., "Externally Refueled Optical Filaments," Nature Photonics, Vol. 8, April 2014, p. 297, which is incorporated herein in its entirety, and, in particular, including the teaching of the references cited therein, for teaching lasers, dressing laser beams, and techniques for creating plasma channels and/or extending filamentation. In an embodiment, the primary beam (filament beam), which can be a Gaussian beam, and a surrounding dressing beam, can be produced by a single Ti:sapphire femtosecond laser system, e.g., a system that produces 40 fs pulses at 800 nm, with a pulse repetition frequency of 10 Hz and a maximum energy per pulse of up to 25 mJ. The distances from the laser beam source that output the filament laser beams and the dressing beam surrounding the filament beam, that the filaments begin to form are controlled by lensing and the relative energies in the filament beams and the dressing beams. Embodiments incorporate an intersecting stitching technique to create multiple segments of the conductive path by controlling the direction of the filament beam and dressing beam pairs and controlling the distance along the ionizing beam's travel that the filament forms, such that segments of the conductive path are formed of filaments. In an embodiment, all ports emitting an ionizing beam pair (e.g., a filament beam surrounded by a dressing beam) fire simultaneously and the beam pairs intersect nose to tail to stitch the plasma channel (conductive path) to the point of destination (target). In this way, the length of the filament formed by each beam pair can be used as a segment of the conductive path, and the energy transfers before the air molecules recombine.

In an embodiment, by firing lasers from multiple ports that are lensed so that the filament from each port continues where the preceding filament ended, requires that each filament arrives from a slightly different angle from the point of origin. Rings of laser ports can be used, where each laser port is controlled to fire in a timing relationship with the other laser ports so as to ionize one filament of optimum length, a certain distinct distance from the apparatus and orientation with respect to the apparatus, so that each intersects end to end consecutively with filaments from one or more of the other ports to create a conductive path made up of the multiple segments, thereby overcoming the physical limitation of an individual filament. The distance achievable is the filament length of the individual filaments added together, taking into account points of intersection and other parameters of the process. An embodiment can have a spiral combination of filaments, spiraling in three dimensions from the apparatus to the target.

In specific embodiments, multiple lasers can be positioned and controlled to create an ionizing beam to intersect the conductive path at the appropriate intersection point to create the multiple segments of the conductive path. In an embodiment, four lasers can be used for creating four corresponding ionizing beams that are used to create four segments of the conductive path.

An embodiment can use a rotating housing for the lasers that provide ionizing beams in desired positions. Further embodiments can allow the one or more lasers to rotate, and/or allow one or more of the lasers to move laterally and/or rotate, and/or have one or more additional lasers remain stationary.

Embodiments of the system can have lasers both at the transmitter station and at the receiver station (target) of a transmission distance L, which can reduce the distance out that segments or filaments need to create, and may also reduce the spacing between the lasers needed to create the multi-filament conductive path, as the lasers at each station are only producing one half of the conductive path.

The following definitions can be used to describe the embodiments shown in FIGS. 15A-47:
L=length of segment;
R1=radius of inner ring of beams;
R2=radius of first ring of beams;
B1=number of beams in the inner ring of beams;
B2=number of beams in the outer ring of beams;
A1=angular spacing between adjacent beams in inner ring of beams; and
A2=angular spacing between adjacent beams in outer ring of beams.

FIGS. 18A-24 show an embodiment with 15 segments, where FIG. 18A provides the coordinate of the location of the laser ports where x and y lie on a plane lying in the page of FIG. 18B, a front view of the housing with the 15 laser ports. In this embodiment, the laser beams do not move, such that (B1+B2) beams give (B1+B2) segments, having angular spacing, A1, A2, between adjacent beams. The angular spacing, A1, A2, between adjacent beams can be such that a good transition of the charge from segment to segment is achieved, which may be a function of R1, R2, L, and/or R1/L and R2/L). For the inner ring of beams the angular spacing, A1, in FIGS. 18A-24 is 72 degrees, and for the outer ring of beams the angular spacing, A2, is 36 degrees.

The outer ring of beams can be spaced away than the inner ring of beams (i.e., (R2−R1)), a distance on the order of L, to be able to make a meaningful enhancement compared with just placing all the beams in one ring. Alternatively, all the beams can be on one ring, or positioned in other layout patterns. Referring to FIGS. 18A-24, in an embodiment, the length of a segment, L, is 40 m, the radius, R1, of the inner ring of beams can be on the order of L, and the radius, R2, of the outer ring of beams can be on the order of 2L. Referring to FIGS. 18A-24, in an embodiment, for L=40 m, the device may have a diameter on the order of 160 m, where if all 15 beams are in the first ring of beams, the diameter may be on the order of 80 m, with A1 equal to 24 degrees. In further embodiments, L can range from 10-100 m, 20-30 m, 30-40 m, 40-50 m, 60-70 m, 70-80 m, 90-100 m, The ratios R1/L and R2/L can be 1/8, 1/4, 1/2, or other, can be chosen to be within certain ranges, and/or a relationship between A and R/L, based on the angle of intersecting beams to make a good transition, can be met.

FIGS. 18A-24 show 15 ports and include segments (e.g., filaments) created by laser beams from each port. The laser "beams" can be distinguished from "filaments" such that dotted (or dotted-dashed) lines represent beams, and the solid lines (or hollow thickened lines) represent the portion of the beam that has been lensed to produce produces an ionized filament at that distance and orientation from the port.

If the device shown in FIGS. 18A-24 were to scale with the 40 m filaments, then the device may be 160 m in diameter. Accordingly the device is not shown to scale in FIGS. 18A-24, but is shown with a different scale in the z direction (direction of charge transmission) than in the x and y directions. The device is shown in this fashion in FIGS. 17-23 so that filaments from different ports can be discerned in the figure.

In an embodiment, a linear array of laser ports for creating the beams can be used. In a specific embodiment with a linear array of laser ports, the first beam at one end of the array can be used to form the first segment (e.g., filament), and then each successive adjacent beam can be used to form the next segment, all the way to the other end of the array, such that the interconnected segments form an arc shape.

In an embodiment, a circular array of beams is used, and the interconnected segments formed by a circular array of beams, using each successive adjacent beam to form the next segment, has a helical shape.

FIG. 18B shows the front view of the device with the device tilted at a 1 degree angle to show perspective, such that the beams come out of the page, where if the device was facing directly out of the page of the figure, the endpoint of the final segment would be at x=0, y=0 (i.e., the center of the front of the device). FIG. 23 shows the device tilted at a 15 degree angle to show perspective, such that the beams go to the right in the drawing. FIG. 24 shows the device facing directly to the right on the page of the drawing.

FIG. 19 shows a specific embodiment where the next filament starts before the beam reaches the current filament. As the beam scatters after the filament ends, having the next filament start before the beam that will form the next filament reaches the current filament can prevent the scattering of the beam that will form the next filament before forming the next filament to create a better contact between filaments. In the embodiment similar to the embodiment shown in FIGS. 18A-24, with 39 meter segments, each filament can start, for example, 1 cm 10 cm, or 1 m, prior to intersecting the endpoint of the current filament and intersect the current filament a similar or corresponding distance from the end of the current filament. Likewise, in FIG. 19, with 38 meter segments, each filament can extend 1 meter past the point of the point of intersection with the next filament. In this way, we can refer to the portion of the filament that provides the conductive path as the segment. Stated another way, the 1 meter mark of each filament intersects with the 39 meter mark of the filament it intersects with. Further, as a beam that is not yet a filament can scatter upon attempting to pass through a filament (i.e., intersect a filament), in specific embodiments, no beam intersects a filament prior to reaching the location the beam is supposed to starting forming a filament.

According to one aspect of the invention, therefore, there is provided an apparatus for the wireless transmission of energy through the atmosphere, comprising:
a. a first ionizing beam emitter for producing a first ionizing beam that creates a first filament through the atmosphere;
b. a second ionizing beam emitter for producing a second ionizing beam that creates a second filament through the atmosphere so as to intersect with the first filament to form a conductive channel formed by the combination of the first filament and the second filament;
c. an energy source, such as a source of electrically charged particles capable of supplying electrically charged particles such as electrons into the conductive channel; and
d. an electrode to introduce the electrically charged particles into the conductive channel.

In another embodiment, with multiple conductive channels, such as the embodiment shown in FIGS. 30A-34, the embodiment shown in FIGS. 35A-38, and the embodiment shown in FIGS. 39A-42, the subject apparatus for wireless energy transmission further comprise of a plurality of charging rods to introduce electrically charged particles, such as electrons, into the corresponding plurality of conductive paths, a control system, and a power source, all electrically connected. The charging rods can carry a negative or a positive charge. When operated in accordance with the method of the subject invention, the charging system permits "shaping" of the charge being transmitted and optimizing stabilization, of the current-carrying conductive channel.

Alternate embodiments of the subject apparatus are adapted for both sending and receiving high order energy. A plurality of the subject apparatus may be arranged in point-to-point fashion with the distances between points (i.e., between sending and receiving stations) being of 50 m, 100 m, 200 m, or longer, to create a "pipeline" connecting a power source to a remote target, such as a remote receiving station adapted for energy collection and storage, or an existing power grid. Additionally, a plurality of the subject apparatus may be arranged so as to create a wireless energy transmission grid.

Embodiments of the subject invention can incorporate lasers and laser beam generation techniques taught in references 1-10. In particular, lasers and laser beam generation techniques taught in reference 7 can incorporate can be incorporated, where reference 7 teaches that with the right beam source the filament can stretch to 100 m. Physical limitations to reaching optimal distances, such as the intensity of the beam and the beam's natural tendencies to sub-filament as the diameter is increased, need to be taken into account.

FIGS. 35A-38 and 39A-42 show embodiments having 44, and 48, ports, respectively, each with four interconnected filament strands. The 44 port embodiment shows a single ring of laser ports and each strand does one complete spiral before the four strands come together in the center. The 48 port embodiment shows four rings of 12 ports each and each strand does four complete spirals before the strands come together in the center.

FIG. 43 shows a ball electrode for introducing electric charge into the conductive channel. The initiating laser beam shoots the first filament through a "ball electrode", as in the successful experiment noted in reference 9, which is incorporated herein in its entirety. FIG. 45 shows a modified version of FIG. 9 to show that all electrodes having a "ball electrode" that would correspond to any or all initiating ports. FIGS. 43-44 and 46-47 show the filaments electrified. FIGS. 46-47 show the establishment of a grounded electric field between sending and receiving stations.

Embodiments can incorporate techniques to extend the length of single filament of conductive plasma in the atmosphere, such as techniques to accomplish the same taught in references 1-10, which are incorporated by reference in their entirety. Embodiments of the subject invention uses a multiport device capable of simultaneously creating (unspooling) a multitude of single filaments, lensed to intersect, at differing distances, using the current state of the art. This can create a conductive channel having a length of the length for each filament length multiplied by the number of ports employed.

Referring to FIGS. 43-47, the laser beam of the initiating port passes through the charge electrode in the focal plane of that port's filamentation. Other ports are set on different focal models so the filamentation occurs at the point of intersection with the preceding filament. The mathematical combinations are based on the number of ports employed and the variety of filament structures is able to vary to meet conditions and the objectives of the energy transfer.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein:

Existing apparatus to produce the filaments and focus the filaments at different distance from the laser source are known, and can be utilized in embodiments of the invention. Embodiments can propagate the beam from the laser source via the subject, apparatus to form a $f_y$.

A ball electrode, as taught herein, can also have a different, and/or additional, function as a spectrometer dedicated to the beam propagating from that specific port.

Figure 1:
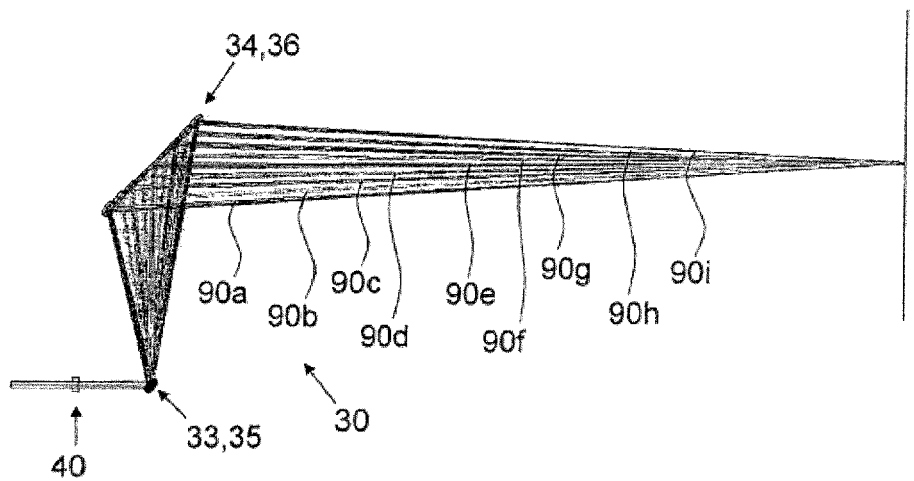

FIG. 1 shows an apparatus having a set of telescopic means and a set of deflection means, which can be incorporated with the subject invention.

Figure 2:
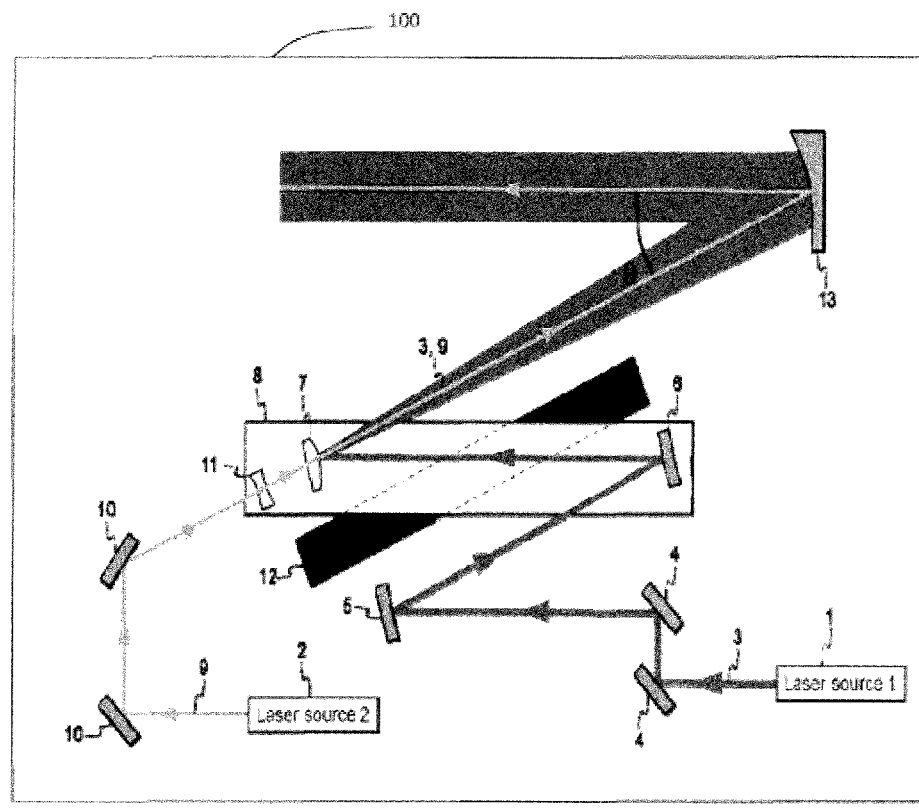

FIG. 2 shows a graphical representation of a telescopic system, which can be incorporated with the subject invention.

Figure 3:
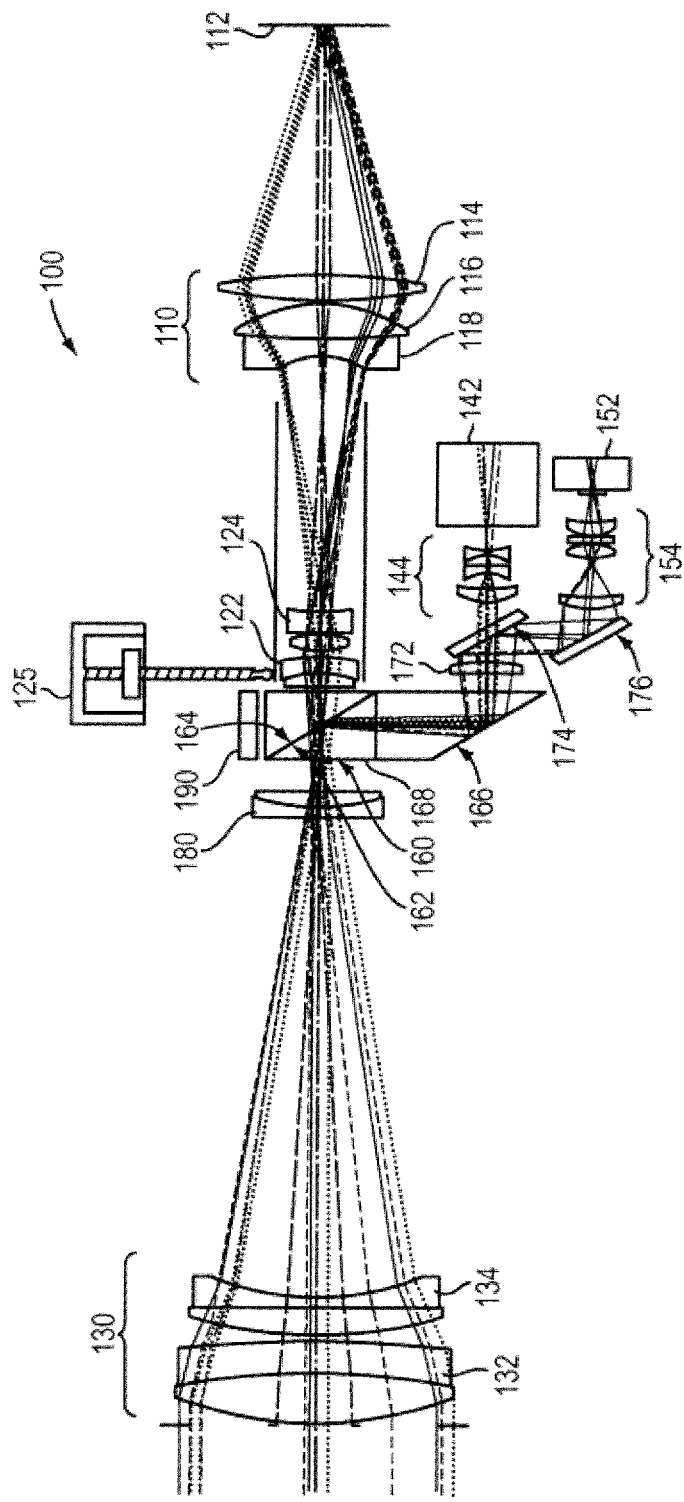

FIG. 3 shows a block diagram of an optical sight, which can be incorporated with the subject invention.

Figure 4:
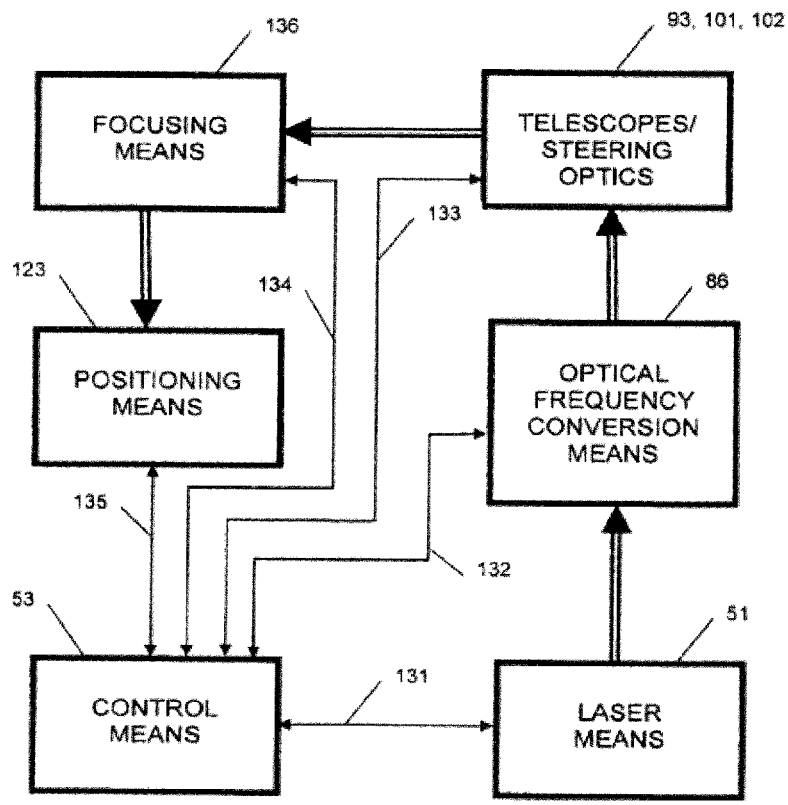

FIG. 4 shows a schematic drawing of a laser processing system, with a control system, parts, or all, of which can be incorporated with the subject invention.

Figure 5:
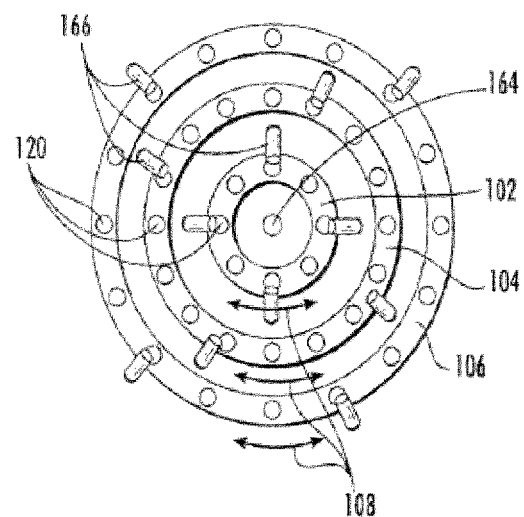
Figure 6:
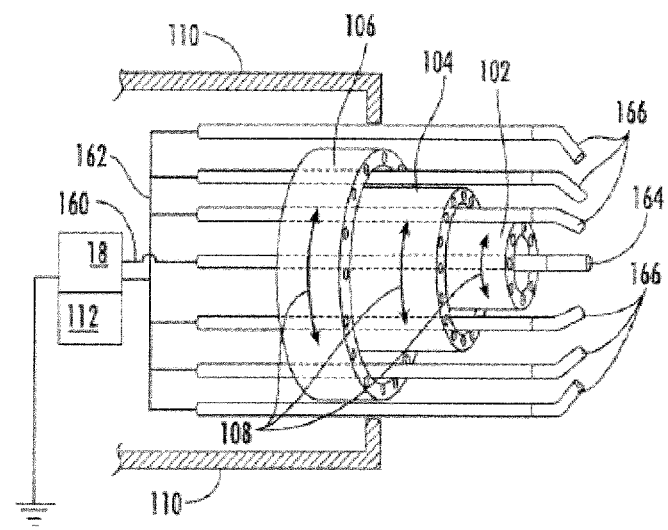
Figure 7:
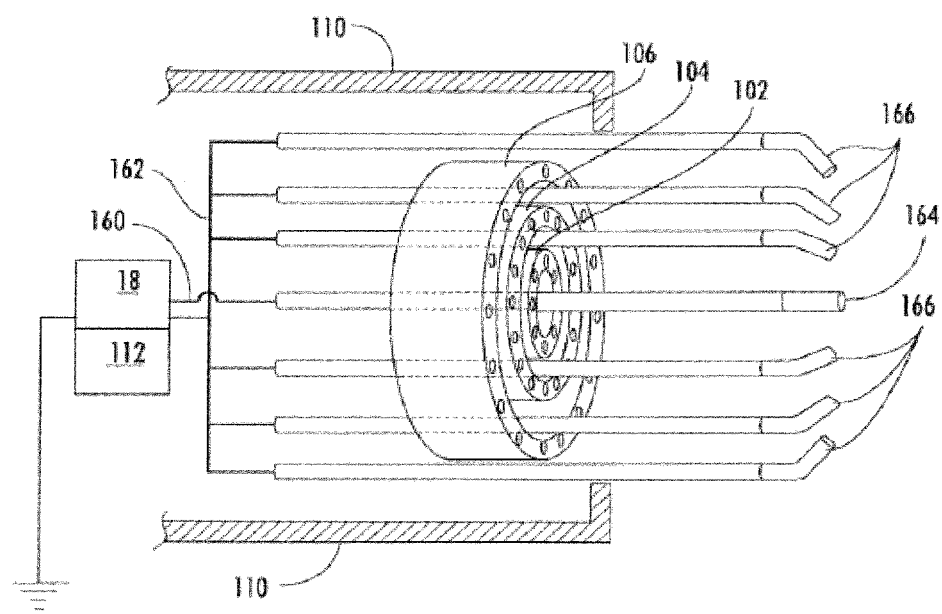
Figure 8:
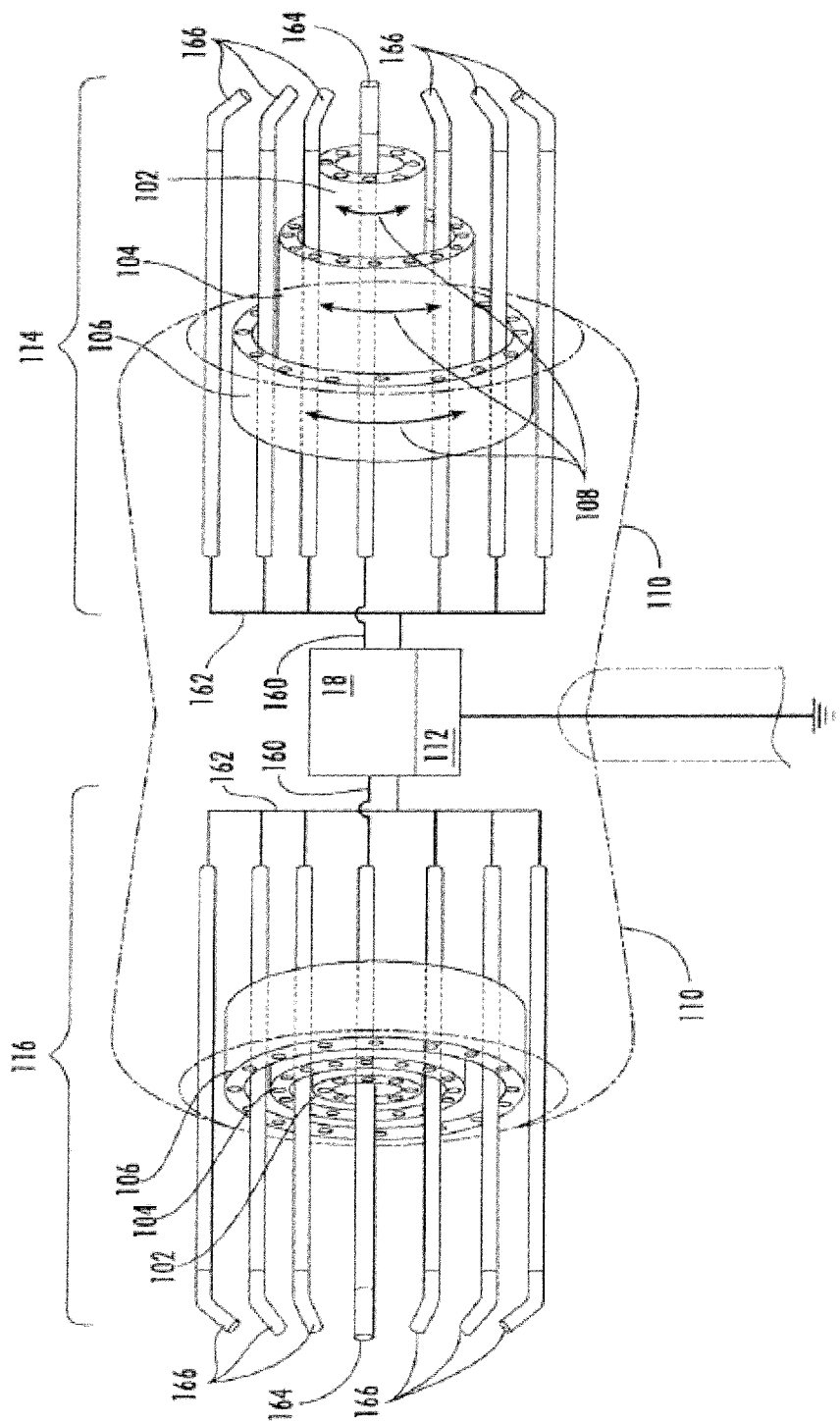
Figure 9:
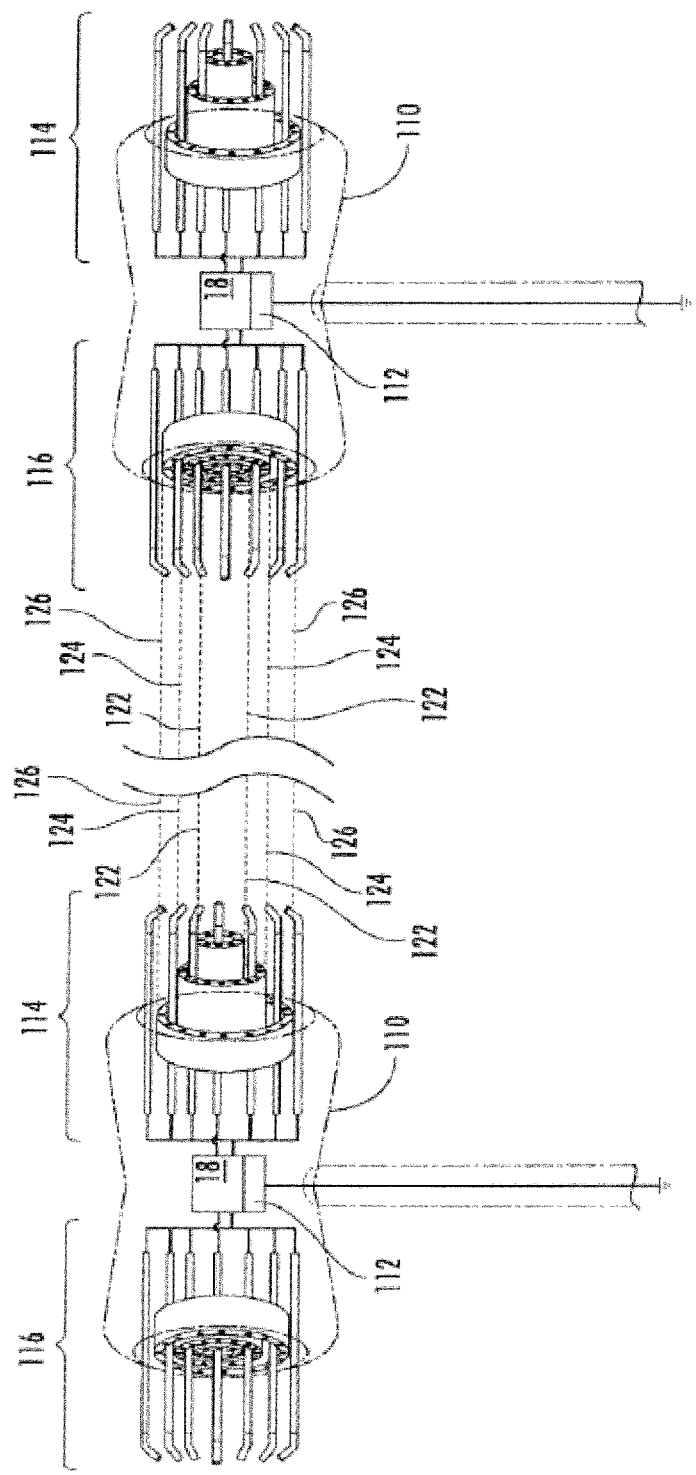
Figure 10:
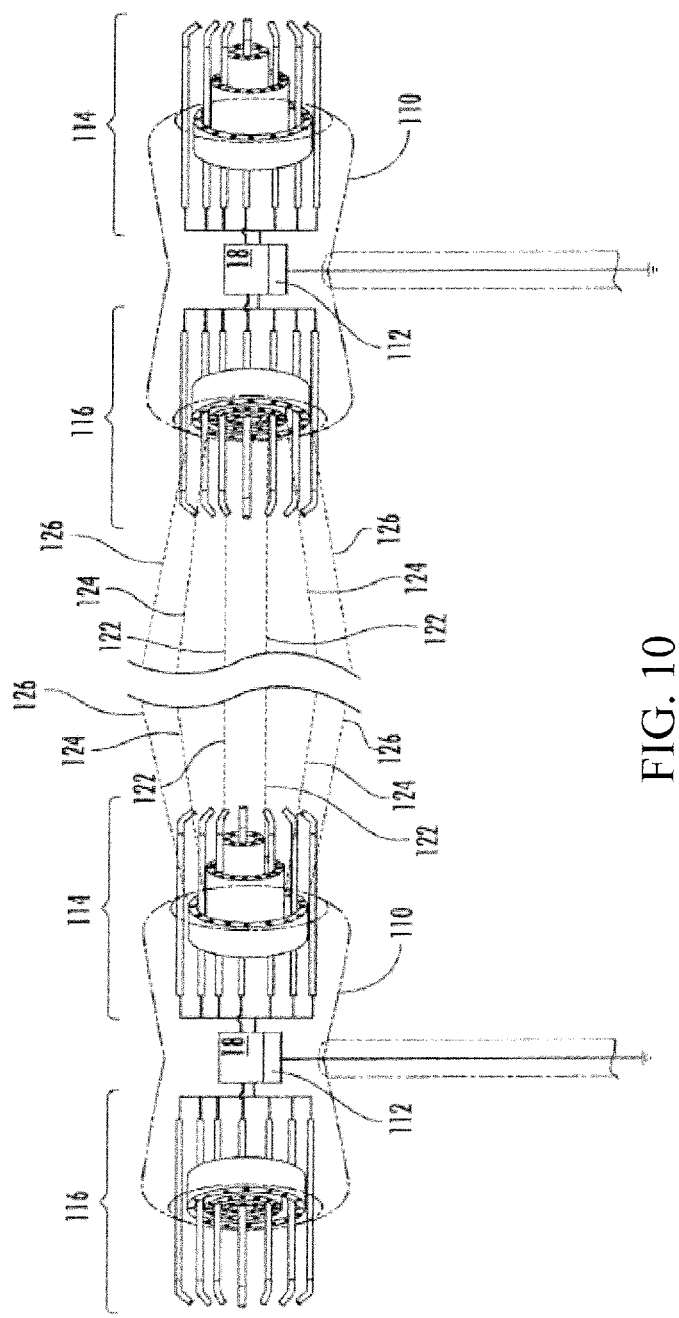
Figure 11:
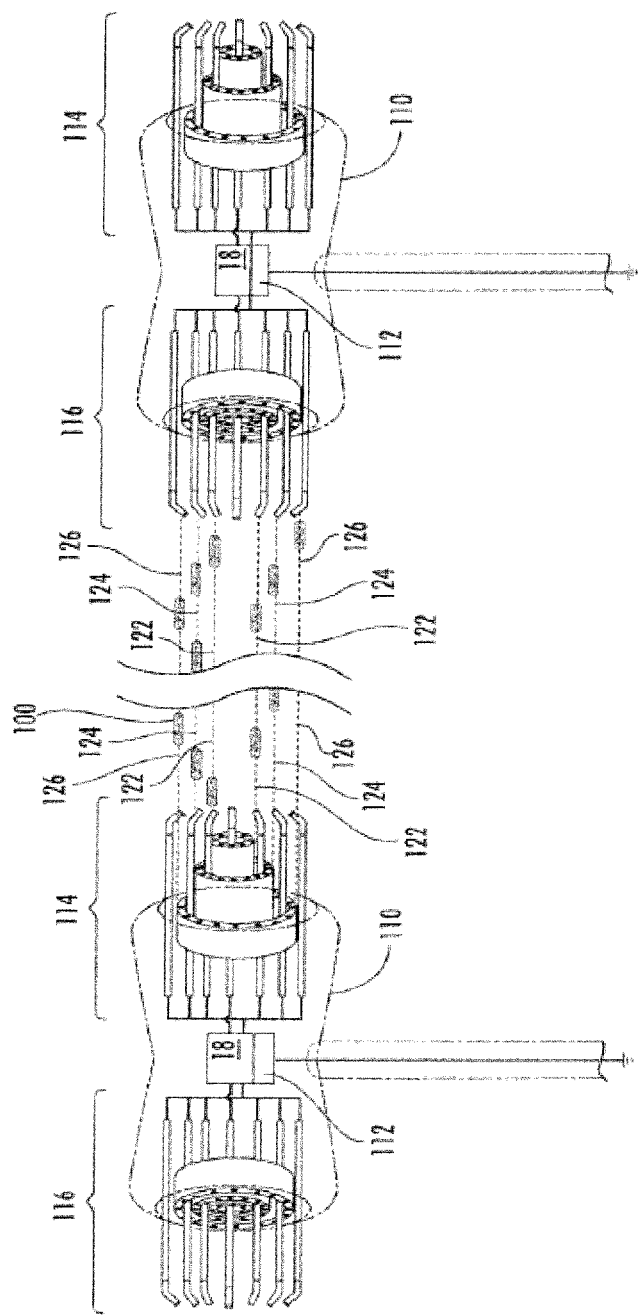
Figure 12:
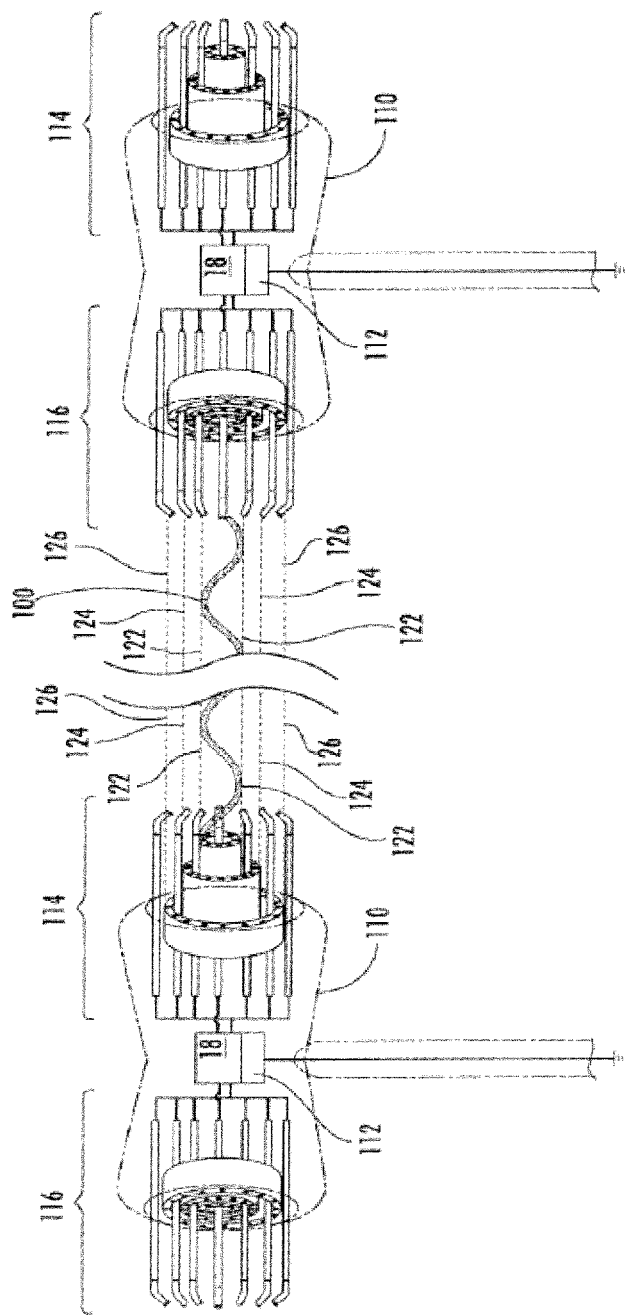
Figure 43:
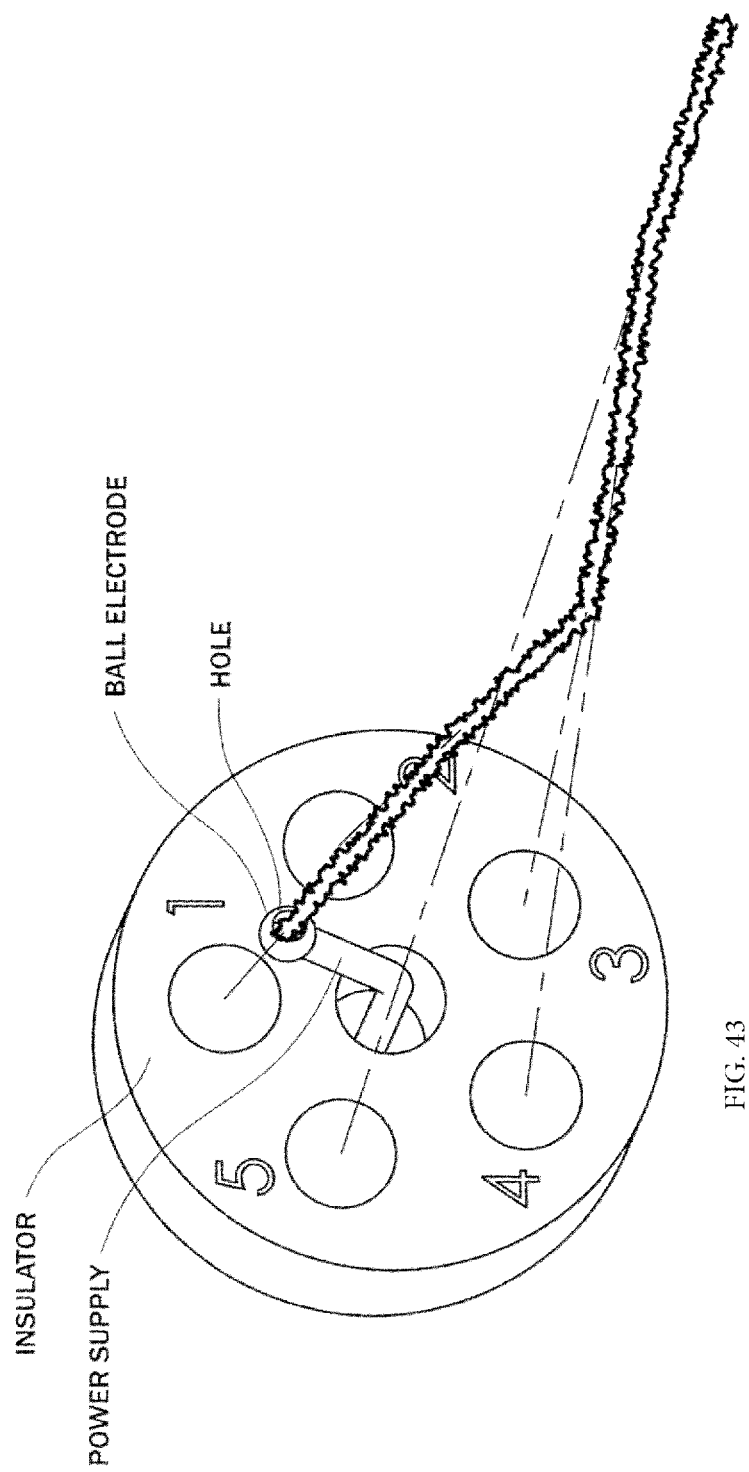
Figure 44:
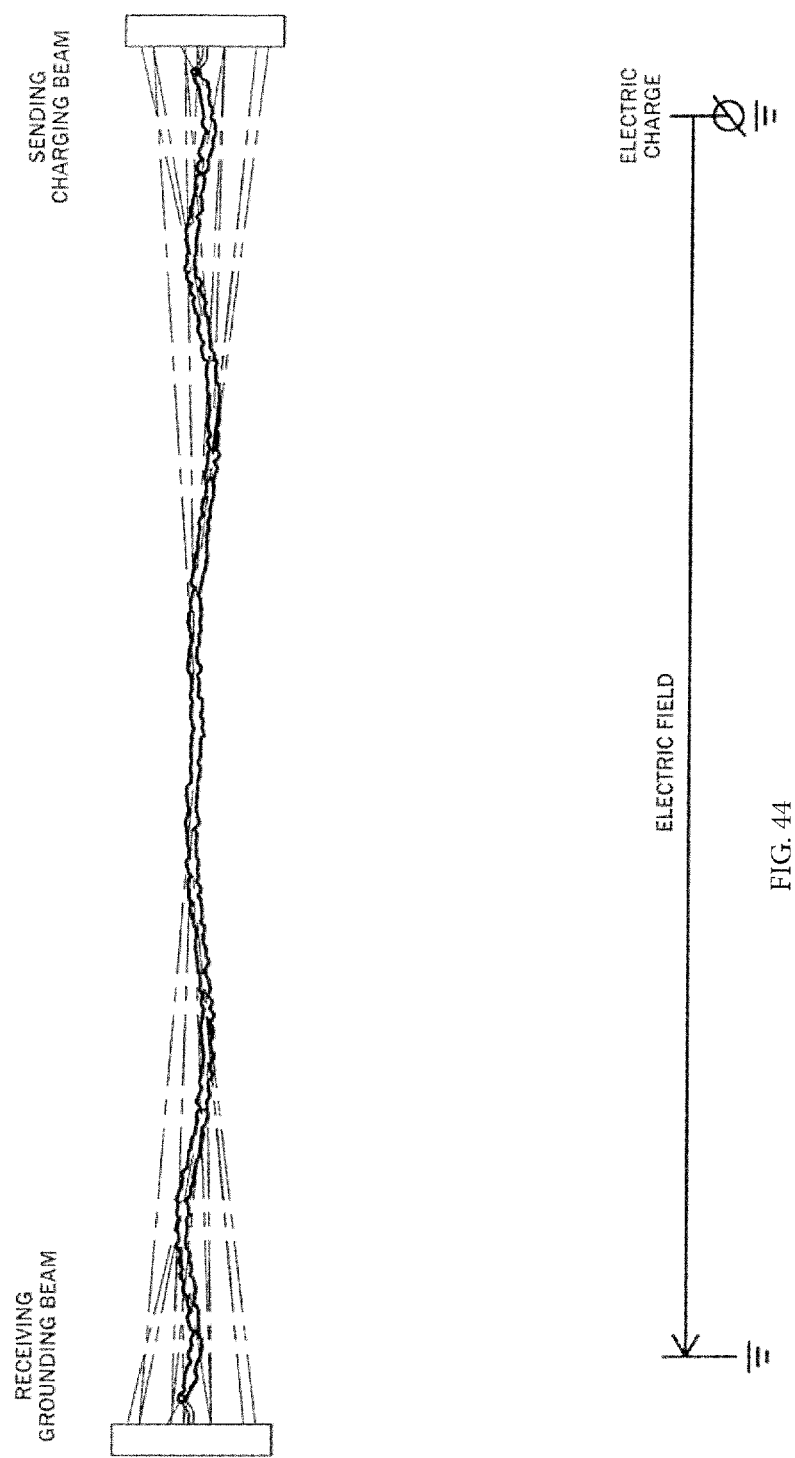
Figure 45:
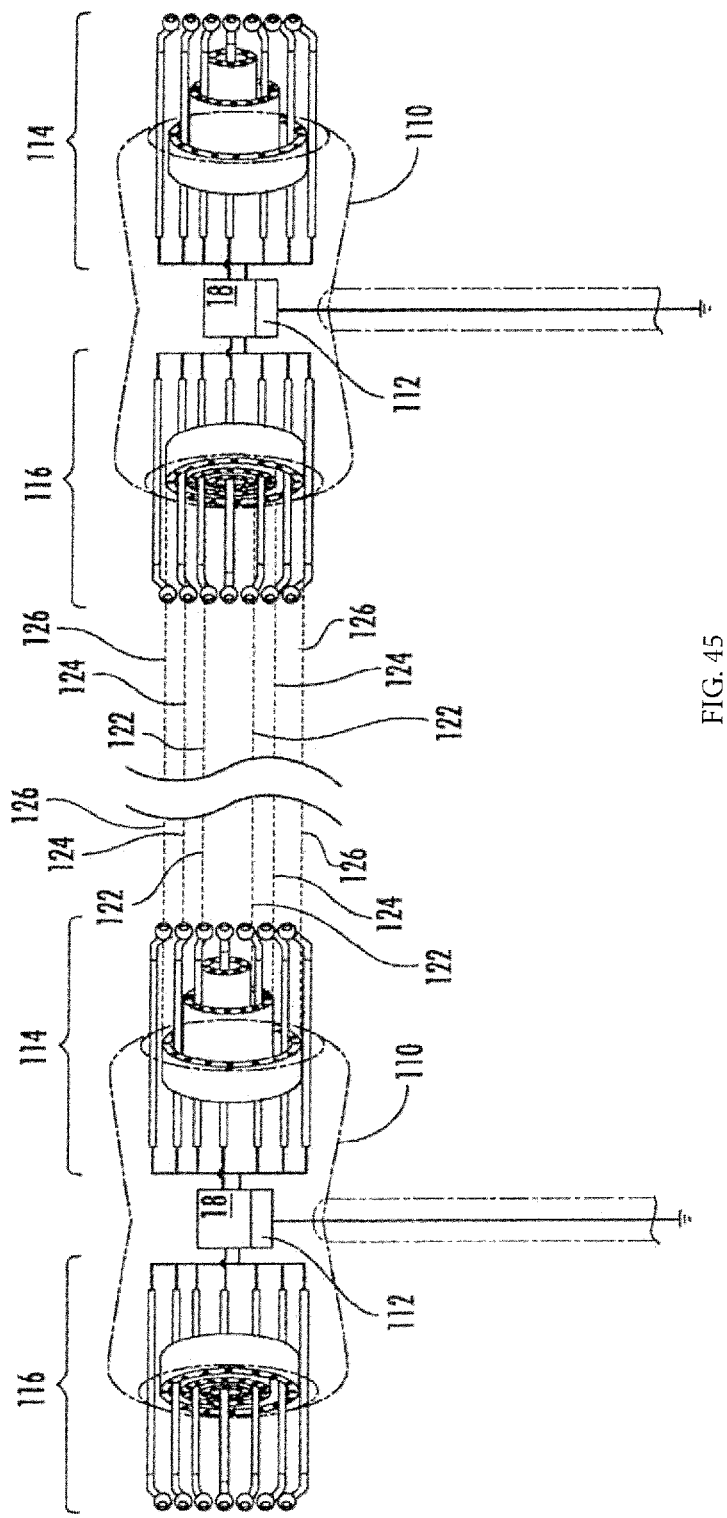
Figure 46:
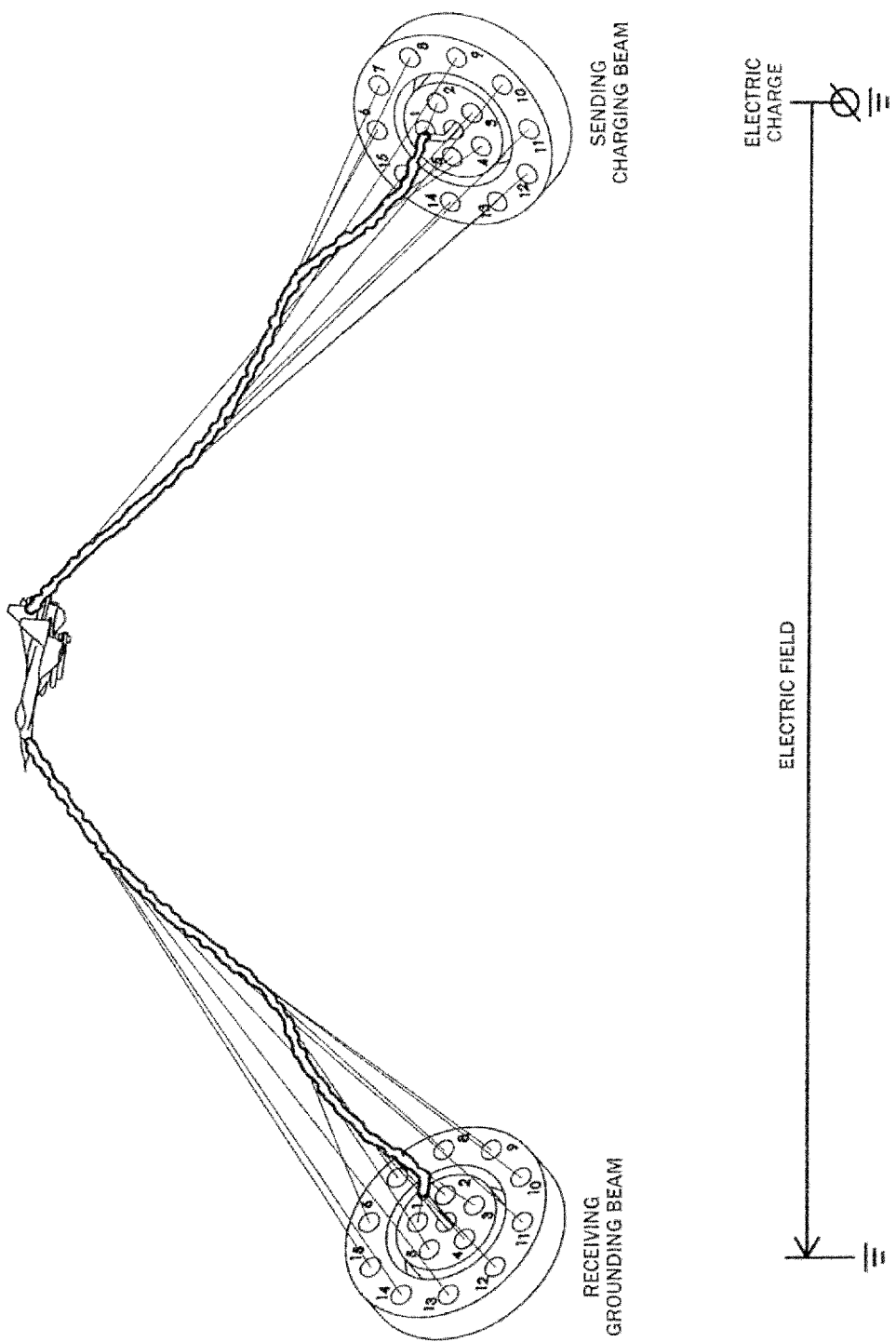
Figure 47:
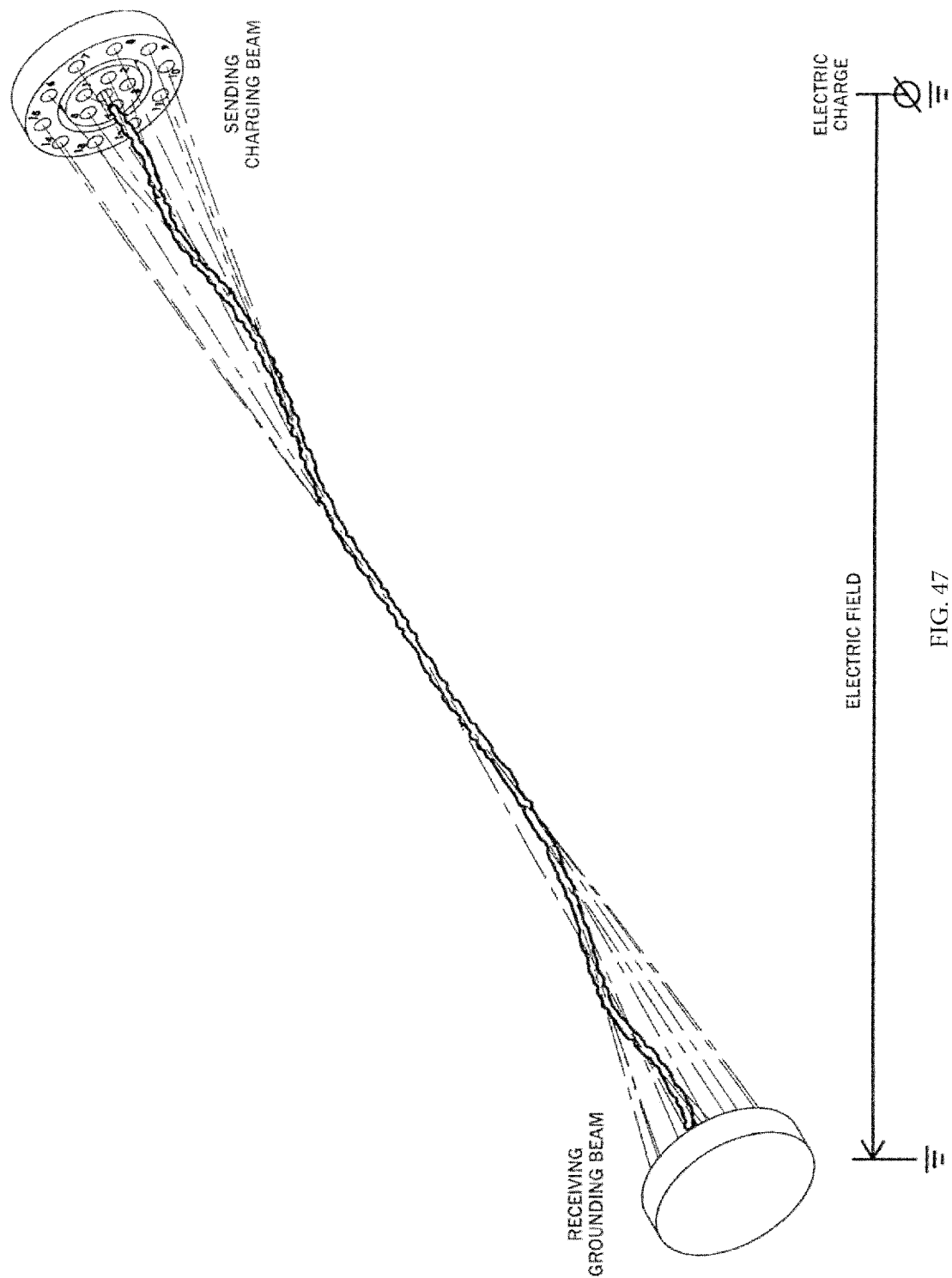

FIG. 5 is a frontal illustration of wireless conductive filament producing apparatus for wireless transmission of energy;

FIG. 6 is a perspective illustration of the wireless conductive filament producing apparatus of FIG. 5 shown in an extended position;

FIG. 7 is a perspective illustration of the wireless conductive filament producing apparatus of FIG. 5 shown in a retracted position;

FIG. 8 illustrates a dual sending and receiving embodiment of the subject invention;

FIG. 9 illustrates a pair of dual sending and receiving stations with intersecting filaments or filament lattice established there between in point-to-point fashion;

FIG. 10 illustrates how each of the filaments of FIG. 9 can be manipulated to take on different shapes through adjustment of the direction and focal point of each ionizing beam emitting apparatus;

FIG. 11 illustrates a charge being transmitted between sending and receiving stations;

FIG. 12 illustrates a charge being transmitted between sending and receiving stations;

FIGS. 13A-13B and 14-17 show an embodiment having 4 laser ports for creating a conductive channel with 4 filaments;

FIGS. 18A-18B and 19-24 show an embodiment having 4 laser ports for creating a conductive channel with 15 filaments;

FIGS. 25A-25B and 26-29 show an embodiment having 4 laser ports for creating a conductive channel with 30 filaments;

FIGS. 30A-30B and 31-34 show an embodiment having 20 laser ports for creating 4 conductive channels, each having 5 filaments;

FIGS. 35A-35B and 36-38 show an embodiment having 44 laser ports for creating 4 conductive channels, each having 11 filaments;

FIGS. 39A-39B and 40-42 show an embodiment having 48 laser ports for creating 4 conductive channels, each having 12 filaments;

FIGS. 43-45 show a ball electrode for introducing electrically charged particles into the conductive channel and embodiments incorporating such ball electrode;

FIG. 46 shows an embodiment for using the subject technology to transmit electric charge to a target, such as an aircraft; and FIG. 47 shows an embodiment for transmitting electric charge into the atmosphere above the earth's surface.

DETAILED DESCRIPTION OF THE PREFERRED EMBODIMENT

FIG. 1 of the subject application is FIG. 4B of U.S. Pat. No. 9,573,227. FIG. 4B of U.S. Pat. No. 9,573,227 (MARKING APPARATUS WITH A PLURALITY OF LASERS. DEFLECTION MEANS AND TELESCOPIC MEANS FOR EACH LASER BEAM) depicts a multitude of laser beams from a plurality of lasers that process through telescopic means, and mirrors, and are focused on an object for the purpose of marking that object, is shown herein. FIG. 4B of U.S. Pat. No. 9,573,227 and the teaching in U.S. Pat. No. 9,573,227 regarding the system of FIG. 4B of U.S. Pat. No. 9,573,227, are incorporated herein by reference.

FIG. 2 of the subject application is FIG. 1 of U.S. Pat. No. 9,575,309. FIG. 1 of U.S. Pat. No. 9,575,309 (TELESCOPIC CONTROL OF HIGH POWER LASER PROAGATION) " . . . provides a reflective telescopic system to control the generation of filamentation (i.e. filamentation propagation) of ultrashort and intense laser pulses . . . also contemplates providing adjustments to peak power and chirp of the laser pulses emanating from the telescopic system to optimize the generation of filaments at longer distances." FIG. 1 of U.S. Pat. No. 9,575,309 and the teaching in U.S. Pat. No. 9,575,309 regarding the system of FIG. 1 of U.S. Pat. No. 9,575,309, are incorporated herein by reference.

FIG. 3 of the subject application is FIG. 1 from U.S. Pat. No. 9,632,304. FIG. 1 of U.S. Pat. No. 9,632,304 (DIRECT VIEW OPTICAL SIGHT WITH INTEGRATED LASER SYSTEM) includes " . . . laser rangefinder configured to transmit and receive laser radiation, and a beam combiner assembly mounted to the erector tube assembly and positioned between the erector tube assembly and the objective, the beam combiner assembly configured to combine the laser radiation and the electromagnetic radiation to allow the laser rangefinder to transmit and receive the laser radiation via the optical aperture of the objective, and to maintain optical alignment of the laser rangefinder and the viewed scene during movement of the erector tube assembly." FIG. 1 from U.S. Pat. No. 9,632,304 and the teaching in U.S. Pat. No. 9,632,304 regarding the system of FIG. 1 from U.S. Pat. No. 9,632,304, are incorporated herein by reference.

FIG. 4 of the subject application is FIG. 13 of U.S. Pat. No. 9,774,160. FIG. 13 of U.S. Pat. No. 9,774,160 (FEMTOSECOND LASER PROCESSING SYSTEM WITH PROCESS PARAMETERS CONTROLS AND FEEDBACK) is a laser processing system for micromachining, which has a control system that directs the lasers, optics, focusing, positioning, receives feedback and adjusts on the fly, is shown herein. FIG. 13 of U.S. Pat. No. 9,774,160 and the teaching in U.S. Pat. No. 9,774,160 regarding the system of FIG. 13 of U.S. Pat. No. 9,774,160, are incorporated herein by reference.

FIG. 1 shows a system for marking objects, where essentially packages on a conveyor belt that are marked for individual identification purposes by a plurality of lasers as they pass by the laser source. Elements of the system of FIG. 1 can be incorporated with embodiments of the invention. In particular, the system of FIG. 1 has a number of lasers, which operate independently, employs telescoping means/ per laser and adjusts each laser independently for a setting on the focal length for each mark on a moving object. Also notable in FIG. 1 is that the lasers are tilted (aimed) to converge " . . . on the desired separation at the desired distance from the apparatus for the resolution and dimension of markings being produced."

FIG. 2, shows an apparatus for telescopic control of a high power laser. This apparatus is designed to control the location of the starting point of a filament, at a specific distance from the laser source. Embodiments of the present invention utilize the apparatus of FIG. 2 to control the location of the starting point of an individual filament. Another similarity to the present invention, is illustrated from subject laser source 2 that is independent from the KSF laser source 1, except that laser source 2 does travel through the last optic of the devise, after diverging lens 11, to act as a bore sight or visible (detectable) superimposition of the ultrashort pulse.

In specific embodiments, the system of FIG. 2 can be used to correctly position and orient the pulsed laser that will create the filament, such that the filament is in the correct relative position to the other filaments. Specifically, each pulsed beam laser can be used with the system of FIG. 2 and a CW laser (or other appropriate laser) so that the corresponding plurality of CW lasers of the plurality of pulsed beams can emit CW beams and receive a corresponding reflected signal that provides information regarding the location of the CW beam paths of the other CW lasers, and the orientation and position of the pulsed lasers can be corrected under the CW laser beam paths intersect with the correct other CW beam paths, such that upon all the CW lasers being correctly oriented and positioned, the pulsed lasers can then simultaneously transmit appropriate pulsed beams that create filaments at the correct distance out so as to form the interconnected filament matrix of the conductive path.

FIG. 3 shows a human sight optical system complimented with an integrated laser system. Basically, while the operator has eyes on target, the laser rangefinder is configured to transmit and receive laser radiation to fix the position of the target, even as it is moving. Embodiments of the invention can use a continuous wave (CW) laser to establish position relationships of two or more pulses prior to the firing. In embodiments of the present invention, the KSF filament pulses are fired after the CW laser has established position relationships of several pulses.

FIG. 4 shows a block diagram of a system that uses ultrashort laser pulses to process materials with micron level precision. While to the system of FIG. 4 was utilized for a different application in U.S. Pat. No. 9,774,160, the control system of FIG. 4 can be utilized in embodiments of the subject invention. The control means of FIG. 4 is in communication with all functioning means (e.g., the focusing means, positioning means, the telescopes/steering optics, the optical frequency conversion means, and the laser means), and making changes and adaptations as the process continues, and such a control means can be incorporated with embodiments of the subject invention.

In a specific embodiment of the invention, a communication means can interconnect with a focusing means, CW lasers, KSF lasers, laser ports, control means, telescope/ steering optics, retractable arms/sensors, high voltage means, one or more atomic clocks, a power source, and optional others means, and these block elements can communication with each other as needed, such that the position and orientation of the focusing means, CW lasers, KSF lasers, laser ports, control means, telescope/steering optics, and retractable arms/sensors are controlled by the control means, based on input received from the sensors upon reflection of the CW laser beams, and the one or more atomic clocks allows the timing of the firing of the pulsed lasers to be controlled in a manner allowing the interconnection of the filaments to be accomplished, where the focusing means can be used to determine the initiation of filamentation, the CW lasers and sensors can be used to determine the position of the plurality of CW beams, the KSF lasers can be used to generate ionizing beams that create the filaments, the laser ports can house the ionizing lasers that emit the ionizing beams, the control means can coordinate the working of the various elements of the system, the telescope/steering optics can move the laser ports and change the position and/or orientation of the ionizing lasers and emitting ionizing beams, the retractable arms/sensors move the laser ports and received the reflected CW beams that give information regarding the positon of the other CW beams, high voltage means FIG. 5 shows the front view of an embodiment of the invention. A plurality of laser ports 120 are configured on three movable rings 102, 104, 106 and another laser port in the center 164, or the center can be an extended laser port or extended rod. Also shown are extendable rods 166. Extendable rods 166 can be used as ball electrodes, per FIG. 43, or as discrete sensors or spectroscopy sensors dedicated to each individual port.

With regard to FIG. 6, the apparatus housing rings can be extended with independent rotation 108 in either direction of rings 102, 104, 106. Extendable rods 166 are shown in the extended position, as well as 164. It is also shown that the apparatus is connected to a second energy source 18 and a control system 112.

FIG. 7 illustrates the rings 102, 104, 106 retracted, while the extendable arms 166 and element 164 remain extended. As can be appreciated, many other variations can be accomplished with the present apparatus.

FIG. 8 illustrates that two housings 110 can be coupled together in two separate configurations 114 and 116. As can be appreciated, many other variations can be accomplished with the present apparatus.

In FIGS. 9-12, the dashed lines can be replaced by the intersection of the filaments shown in, for example, FIG. 17, FIG. 19, FIG. 22, FIG. 23, FIG. 24, FIG. 27, FIG. 28, FIG. 29, FIG. 34, FIG. 38, and FIG. 42, and the orientation of the laser ports can be adjusted as well.

With regard to all Figures it is acknowledged that the Figures are not to scale. Some features may be exaggerated or minimized to show details of particular elements while related elements may have been eliminated to prevent obscuring novel aspects. Therefore specific functional and structural details disclosed herein are not to be interpreted as limiting but merely as a basis for the claims and as a representative basis for teaching one skilled in the art to variously employ the present invention. In particular, the next several Figures have elements that are largely out of scale because there are representations of beam angles between laser ports of the invention that if presented in scale, those angles could not be perceived by the eye alone.

Figure 13B:
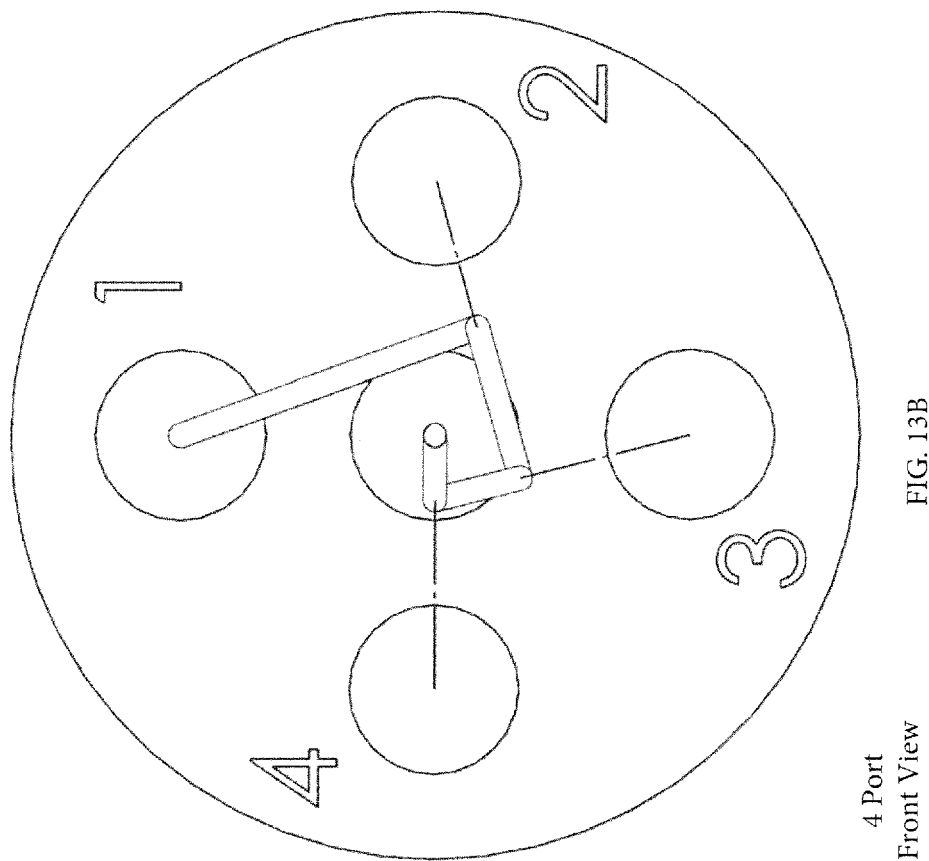

FIGS. 13A and 13B are not to scale but are presented in a manner to simplify the presentation of an aspect of the current invention. FIG. 13B is a block representation of the front view of a four port laser system in accordance with an embodiment of the invention. FIG. 13A is the X, Y, Z coordinates of the arrangement at this enlarged scale. From FIG. 13B, port 1 laser has a focal point $Z_f$ at 0 distance from the laser output source (thereabout) where the first filament initiates and propagates a distance of say 42 meters as a fully conductive plasma filament. Simultaneously, the laser from port 2 fires a beam that has a focal point of $Z_{f2}$ that initiates a filament at 38.903 meters distance from the laser source and intersects the conductive filament of the laser in port 1. The second filament propagates a distance of say 42 meters as a fully conductive plasma filament. Simultaneously, the laser from port 3 fires a beam that has a focal point of $Z_{f3}$ that initiates a filament at 78.637 meters distance from the laser source and intersects the conductive filament from port 2. The third filament propagates a distance of say 42 meters as a fully conductive plasma filament. Simultaneously, the laser from port 4 fires a beam with a focal point of $Z_{f4}$ that initiates a filament at 118.552 meters from the laser source and intersect with the conductive filament from port 3. The forth filament propagates a distance of say 42 meters as a fully conductive plasma filament and the useful purpose of the filamentation is within 158 meters, in range of the device.

Figure 14:
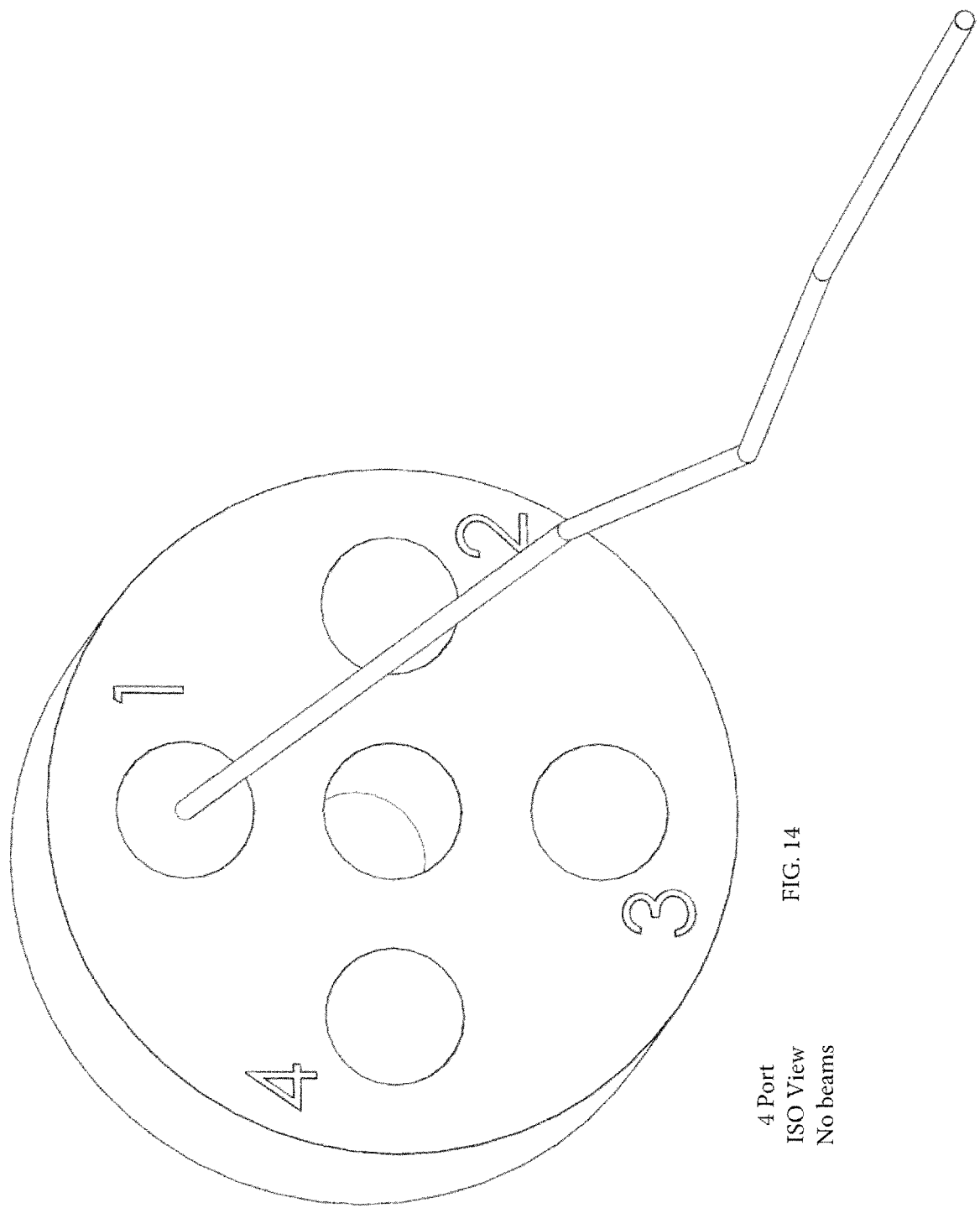

FIG. 14 is a block representation of four filaments joined near a postulated optimum efficacious length of each, by firing four laser ports, each with a different focal model in order to initiate each filament intersection in progression starting from the end of the first filament. FIG. 14 is an angled view of FIG. 13.

Figure 15:
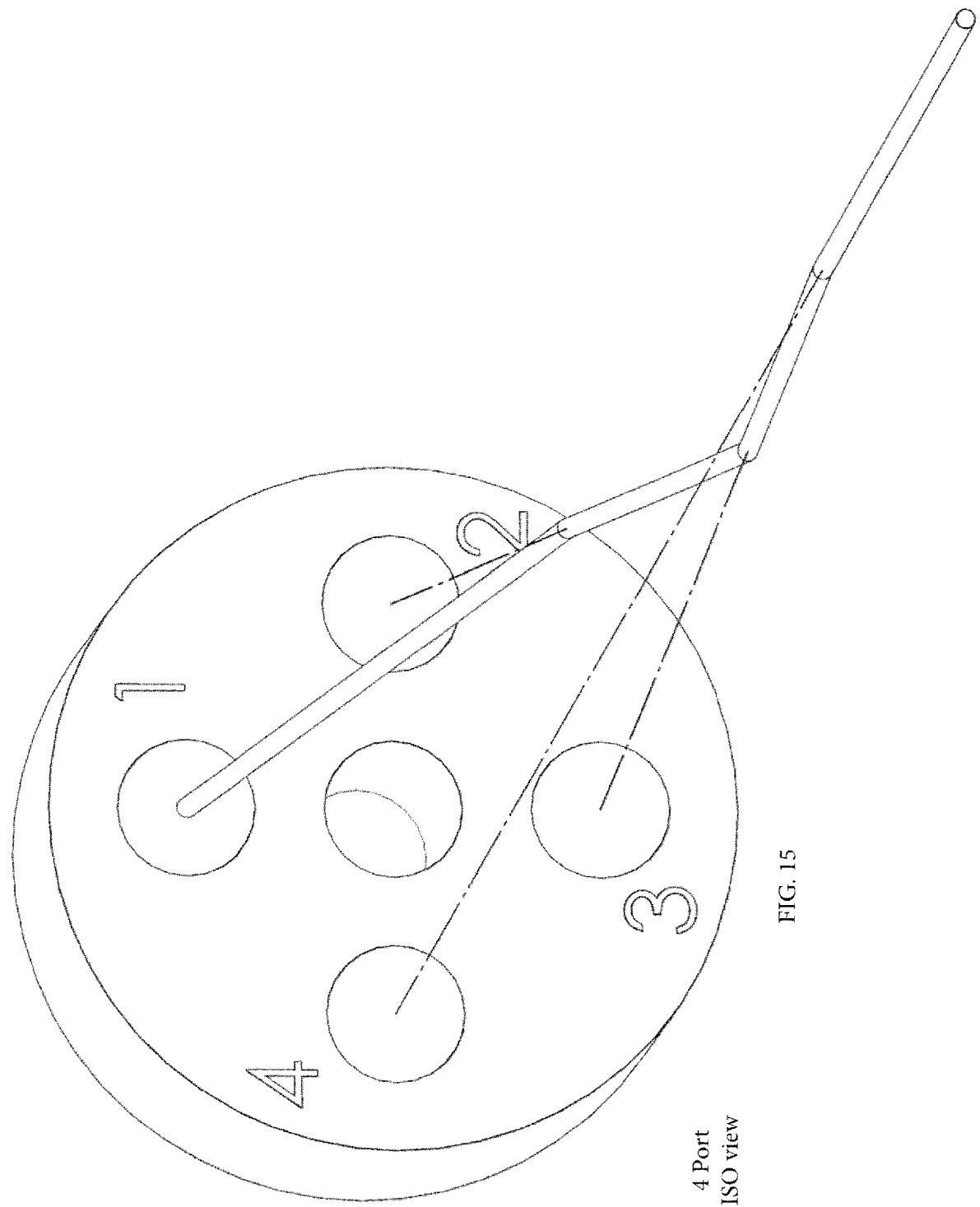

FIG. 15 is an angled view of FIG. 13B, showing the beams. This figure is conceptually showing the relative angles from the four ports. Not shown, is the dissipative tail of each filament that would propagate beyond the pre-positioned intersections.

Figure 16:
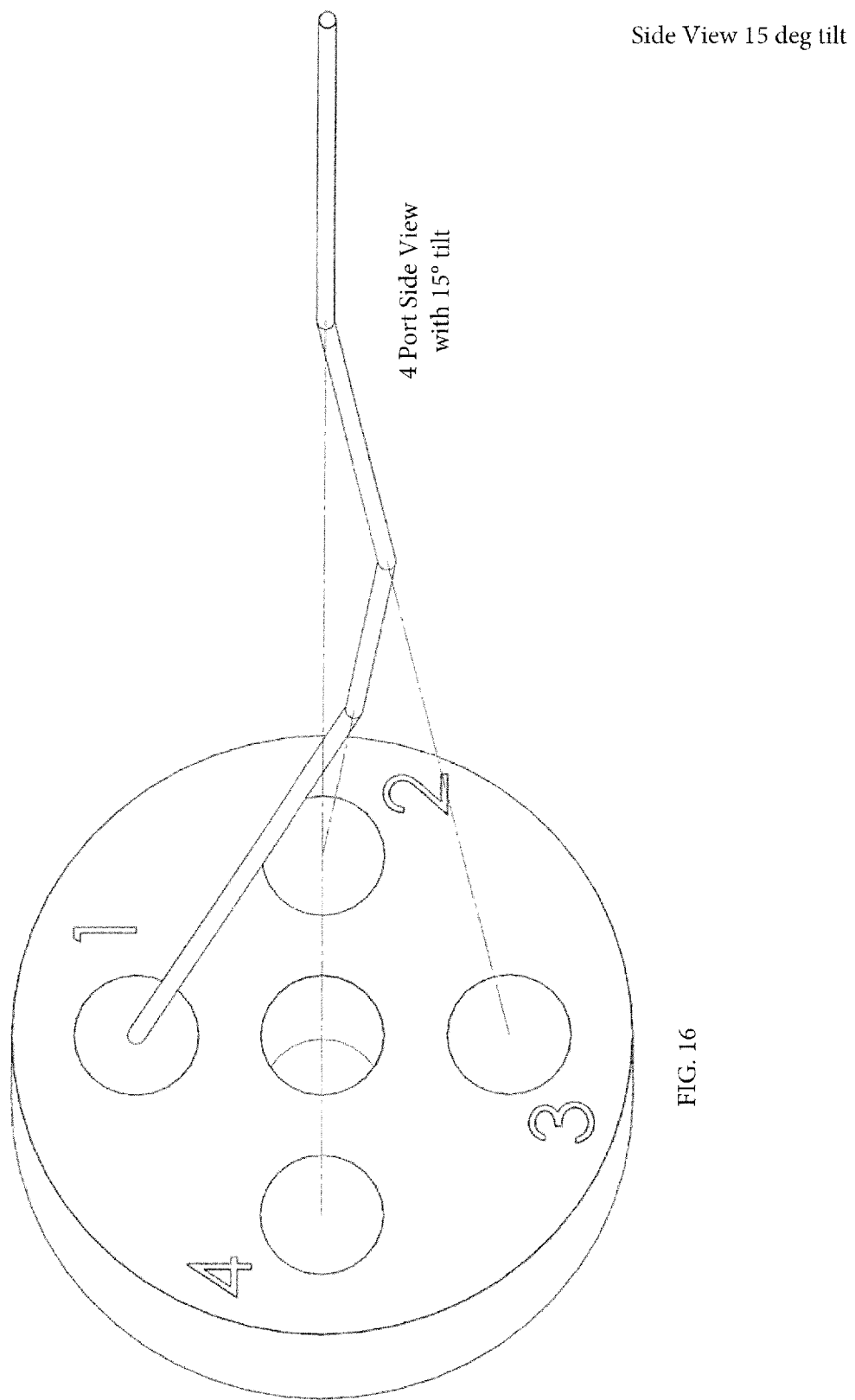

FIG. 16 is the side view of FIG. 13B with a 15 degree tilt.

Figure 17:
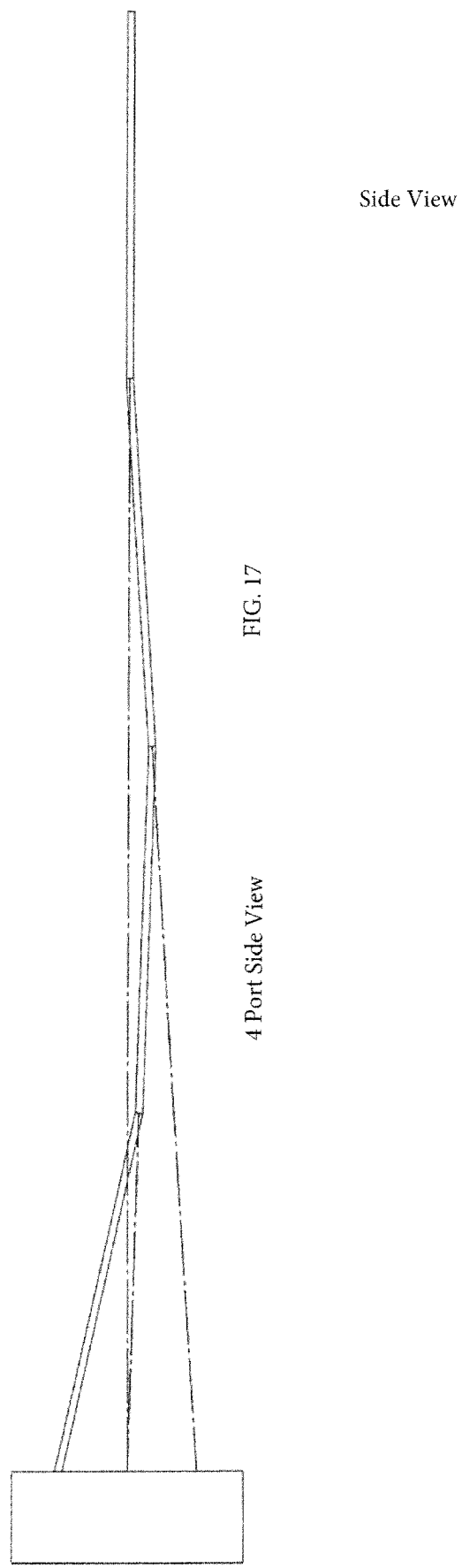

FIG. 17 is a block diagram of the same apparatus with the 27 continuous wave "CW" laser establishing the propagation path and the intersections prior to firing the pulsed KSF lasers. Not shown in this figure, are the sensors that detect the CW laser intersections.

Figure 18B:
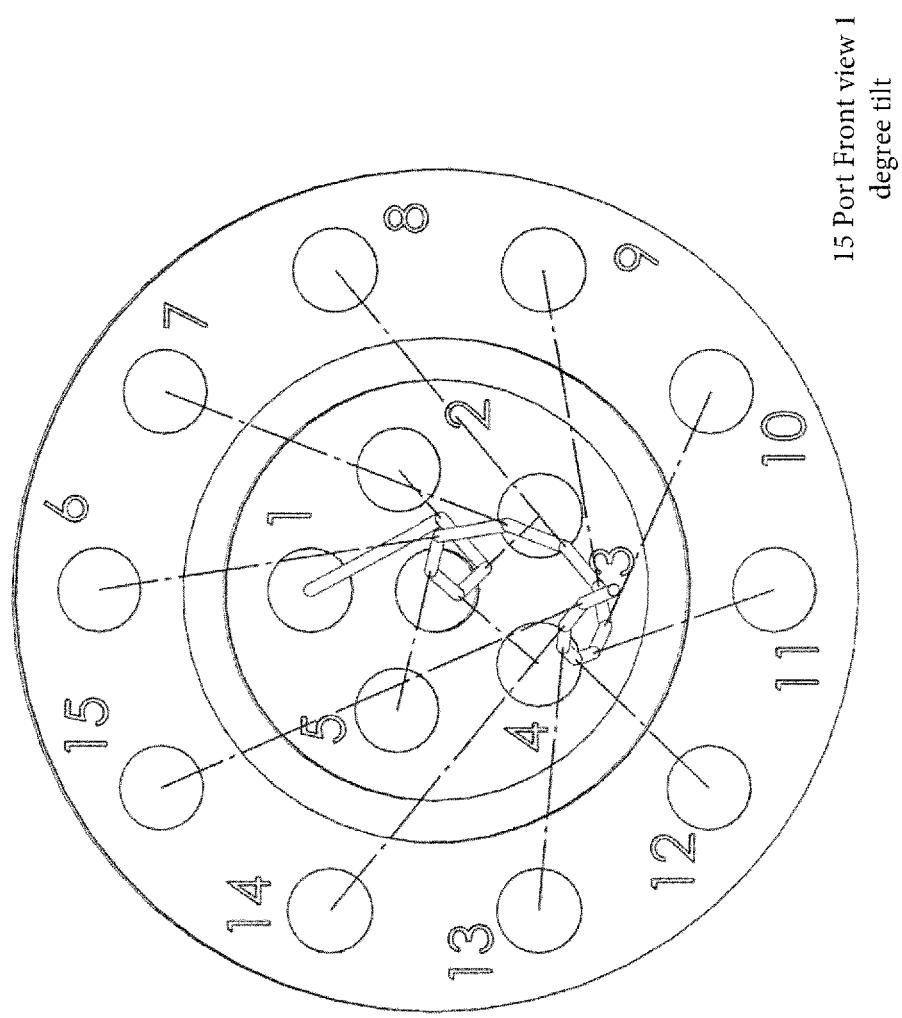

FIGS. 18A and 18B are an expanded 15 port ensemble with each port propagating a CW laser beam to establish the propagation paths to be followed by the shots of the KSF lasers.

Figure 19:
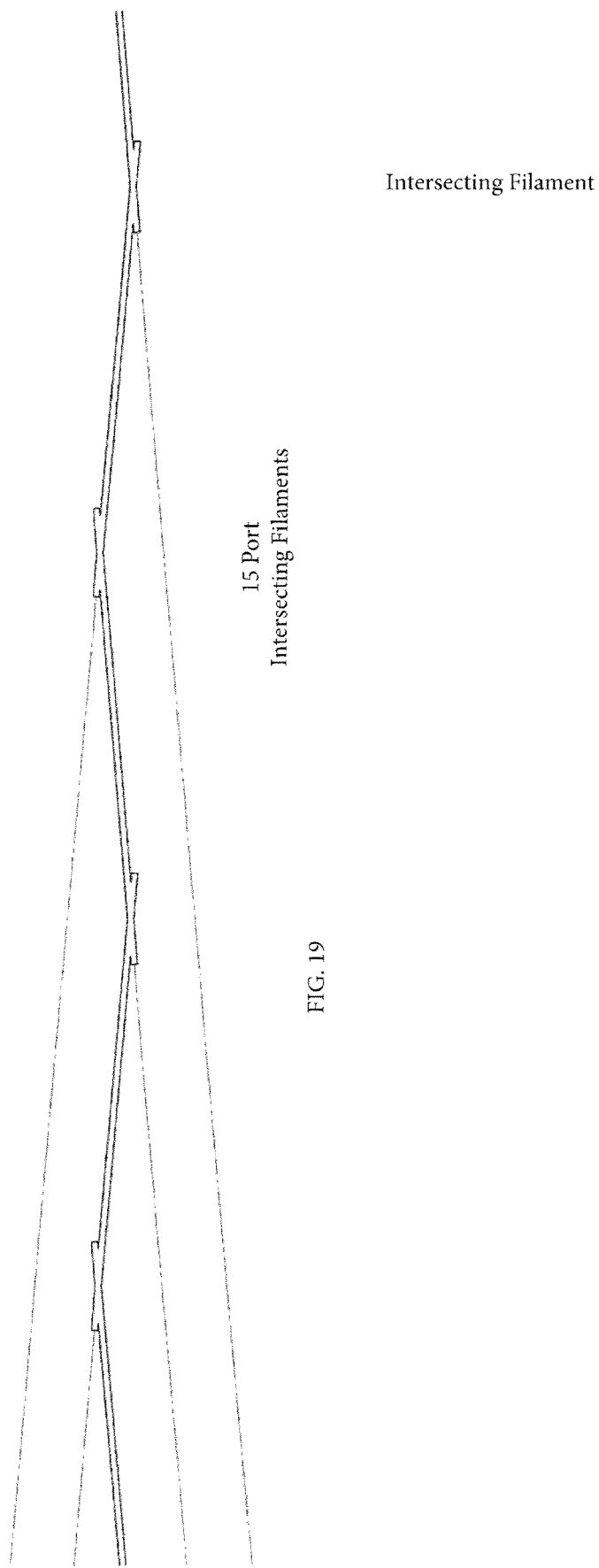

FIG. 19 is a representative cross section of the KSF filament intersections along the laser paths established by the CW lasers.

Figure 20:
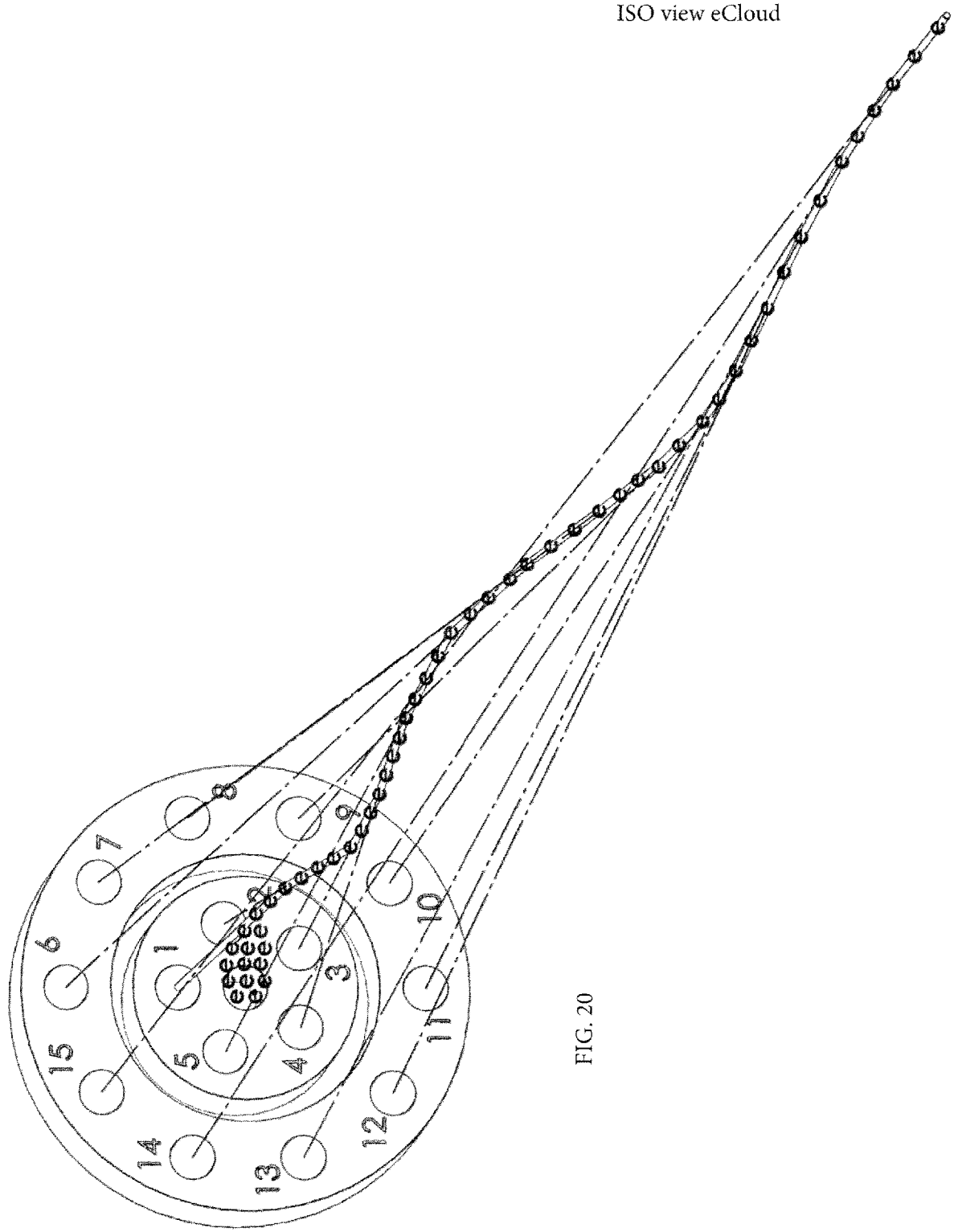
Figure 21:
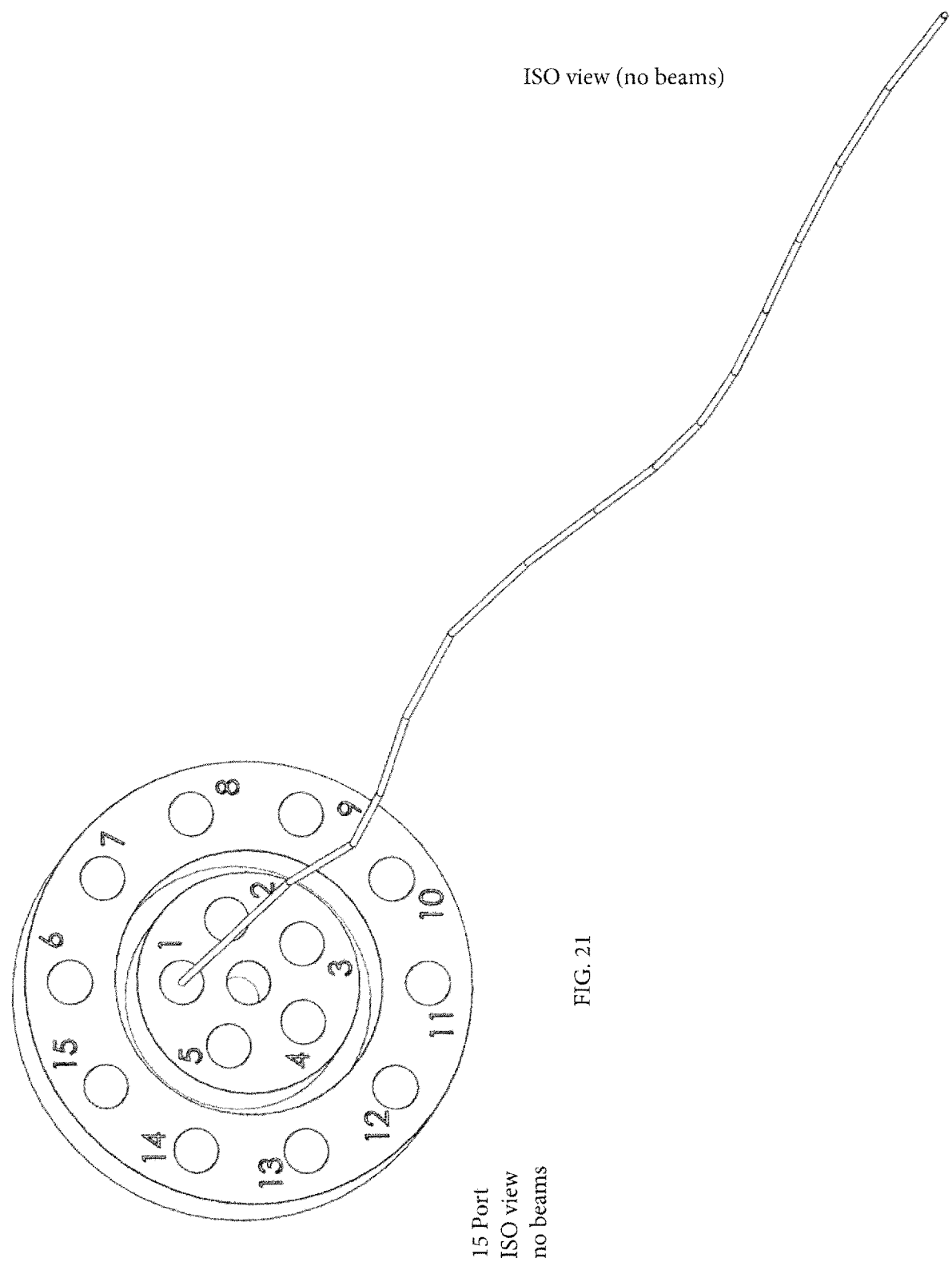
Figure 22:
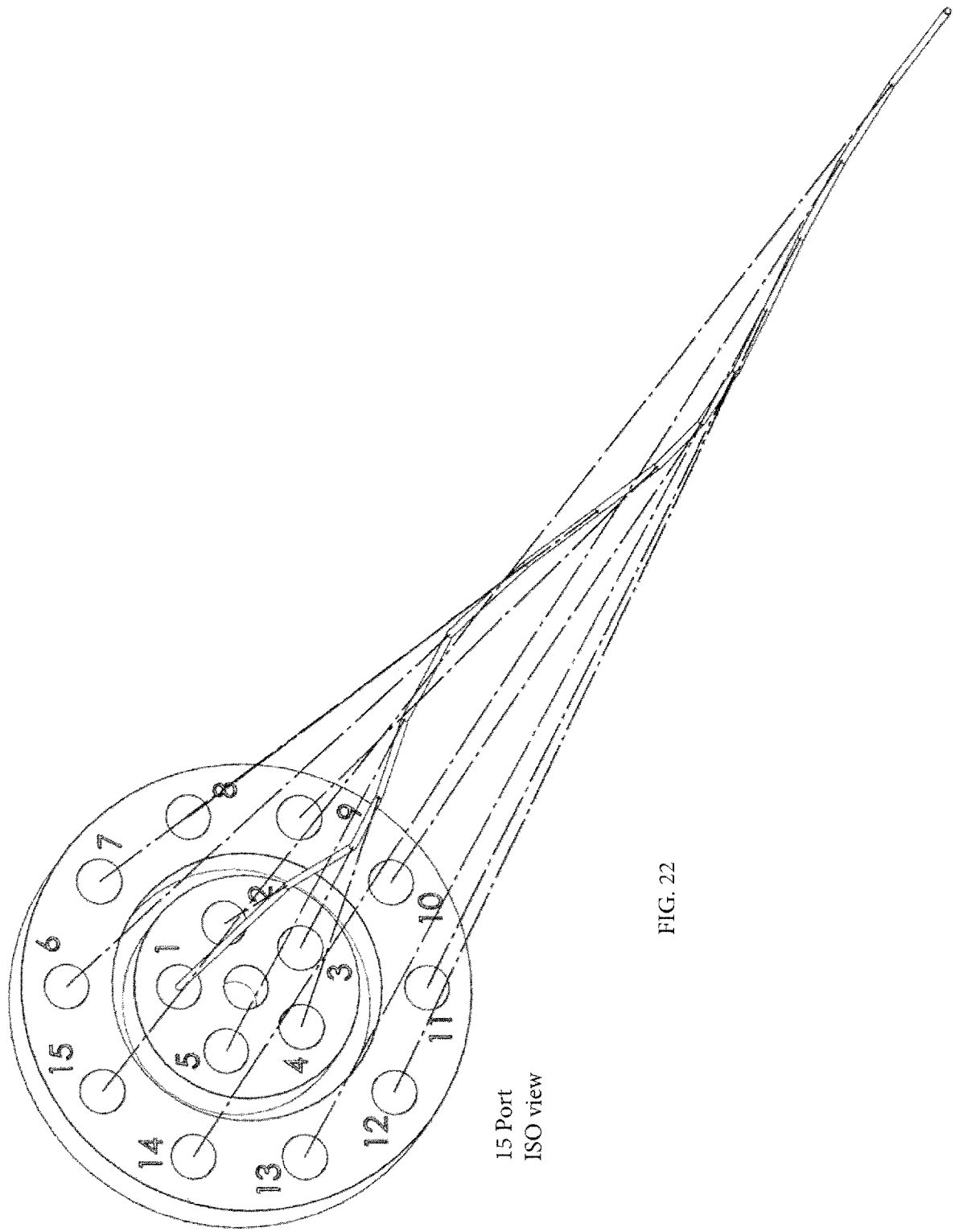
Figure 23:
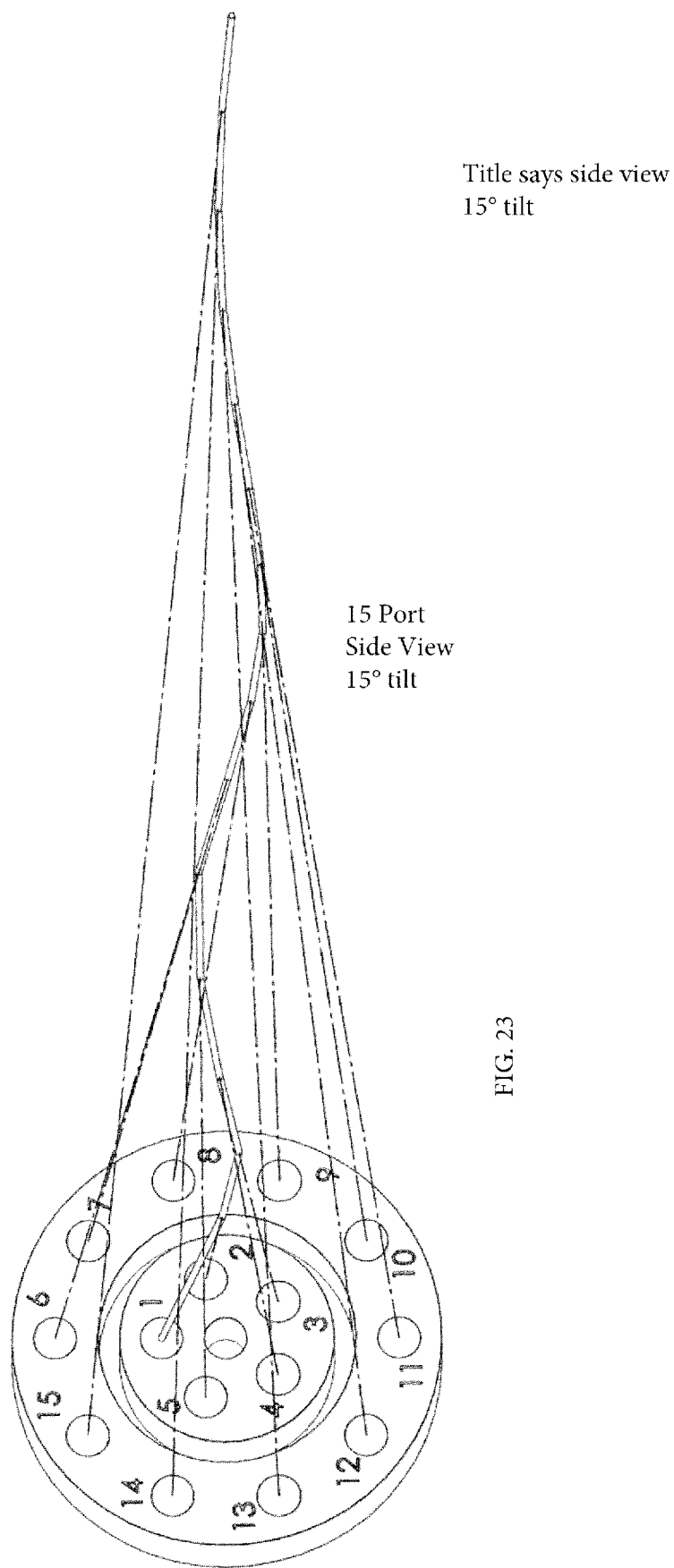

FIG. 20 is a representation of linked filaments being energized by an energy source.

Figure 24:
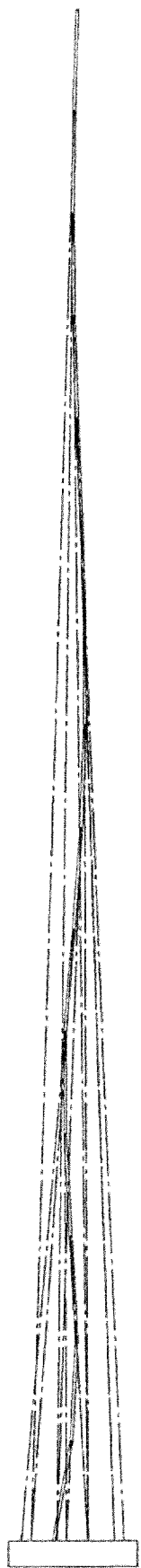

FIG. 24 is a representation of the CW lasers and the KSF lasers working in concert to establish a 15 segment filament.

Figure 25B:
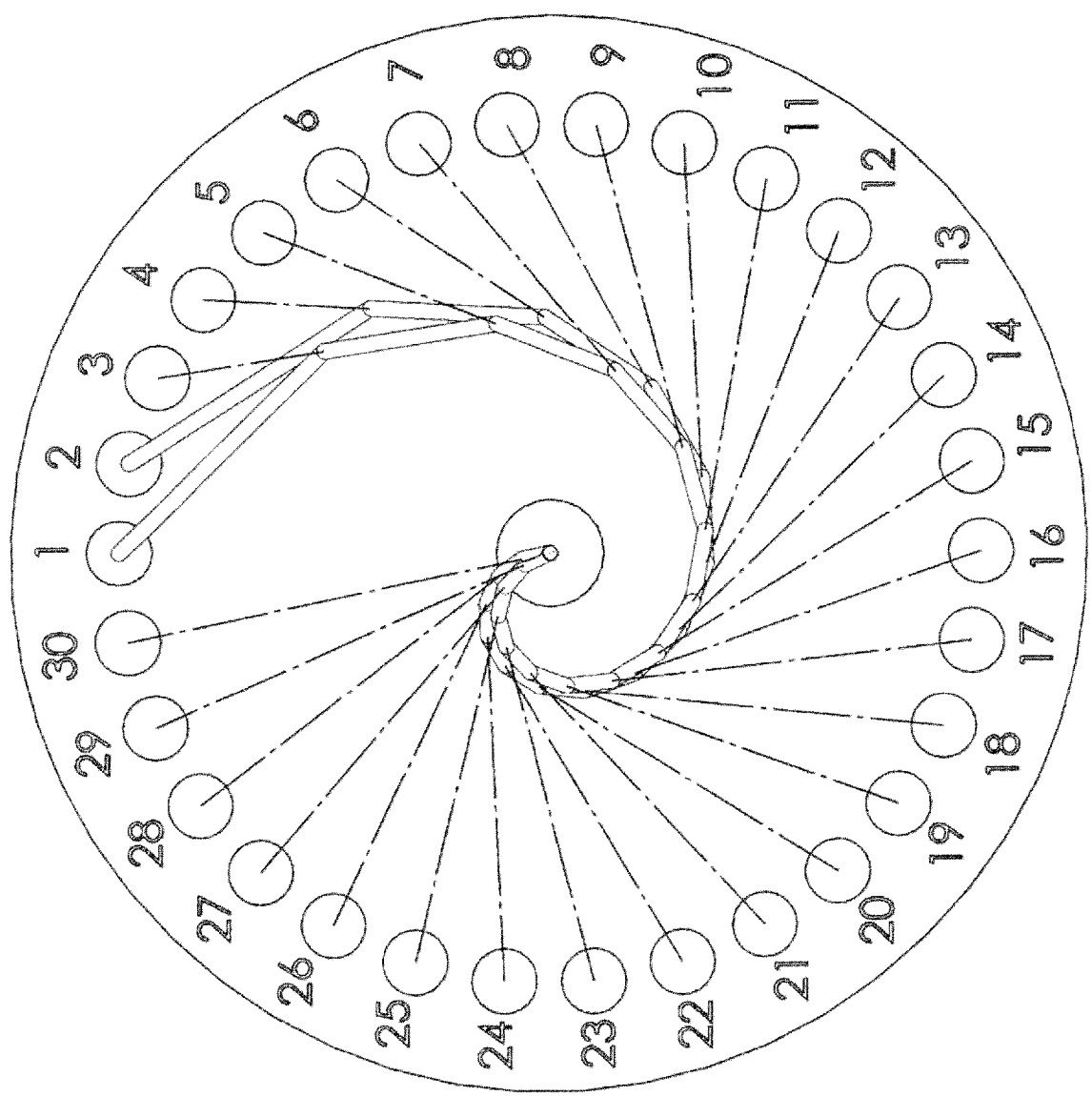

FIGS. 25A and 25B illustrate the variability of the subject design, and are a representation of a single ring with 30 ports that can produce two filament ensembles that are side by side. FIG. 25A is a representation of the coordinates, in this enlarged scale, of each the odd numbered ports establishing a 15 segment filament and each even numbered ports establishing a second 15 segment filament adjacent to the first 15 segment filament. FIG. 25B is a representation of the CW lasers and the KSF lasers working in concert to establish two 15 segment filaments adjacent to each other.

Figure 26:
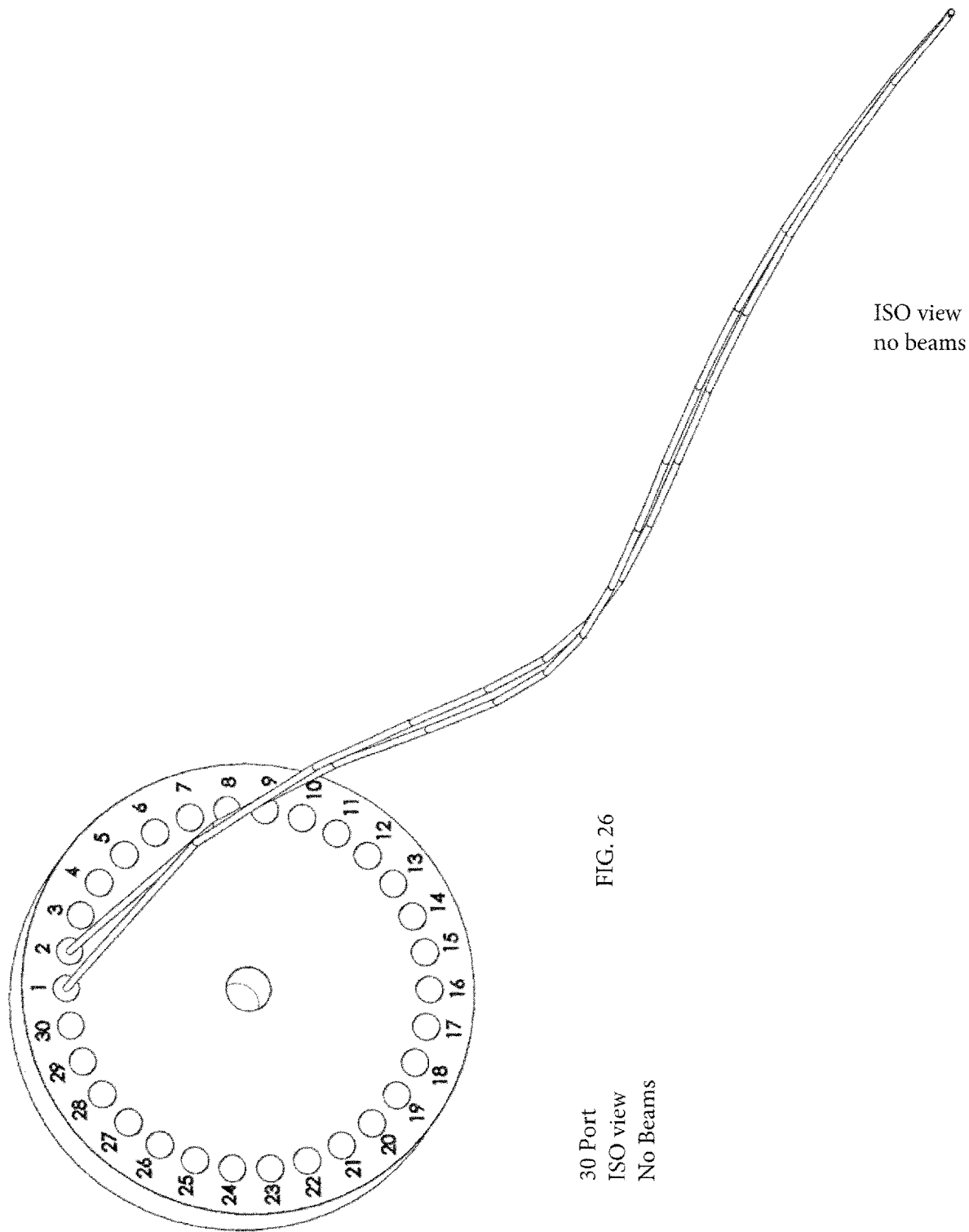
Figure 27:
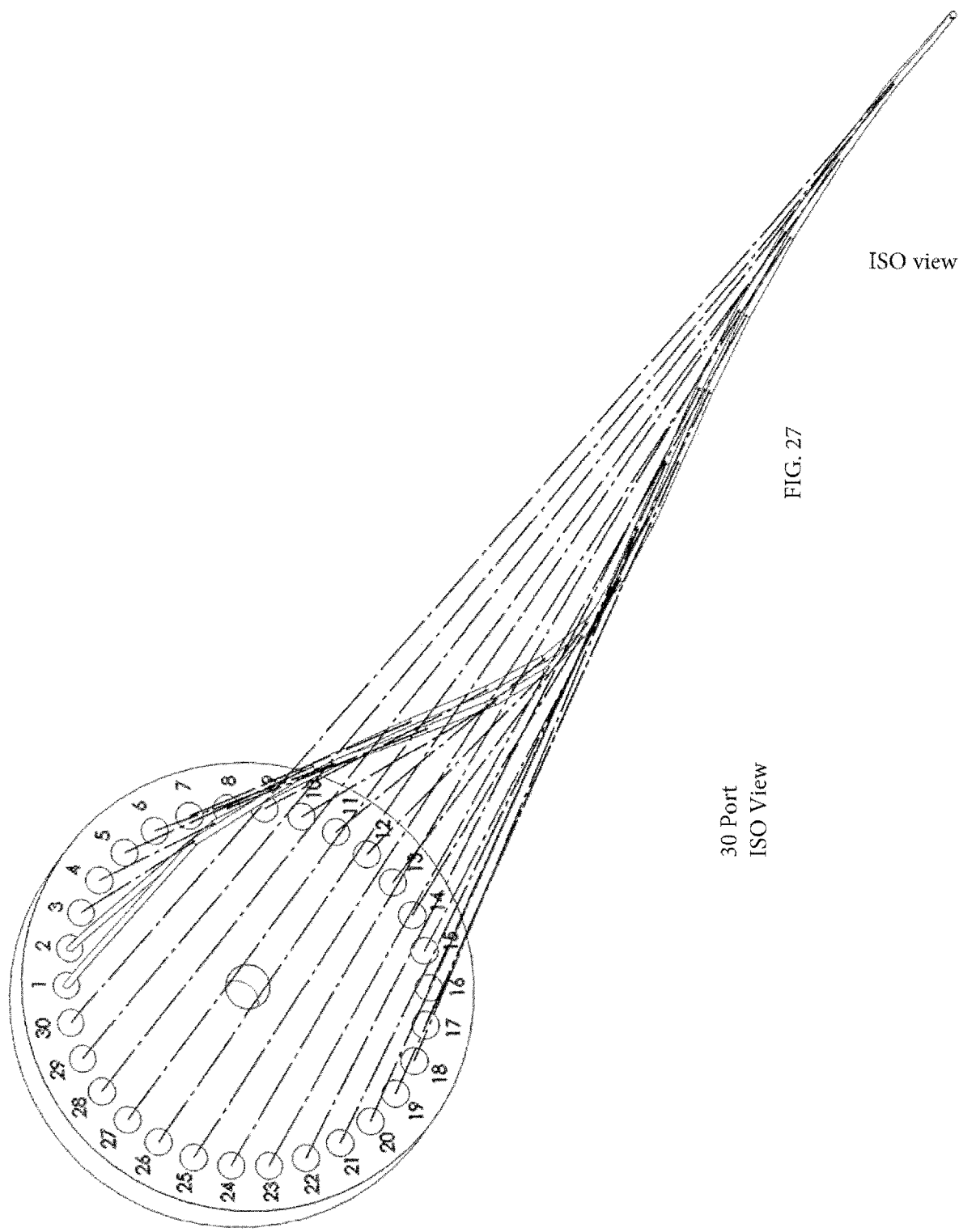

FIG. 26 is a representation of just the KSF filaments, without showing a representation of the CW laser beams.

Figure 28:
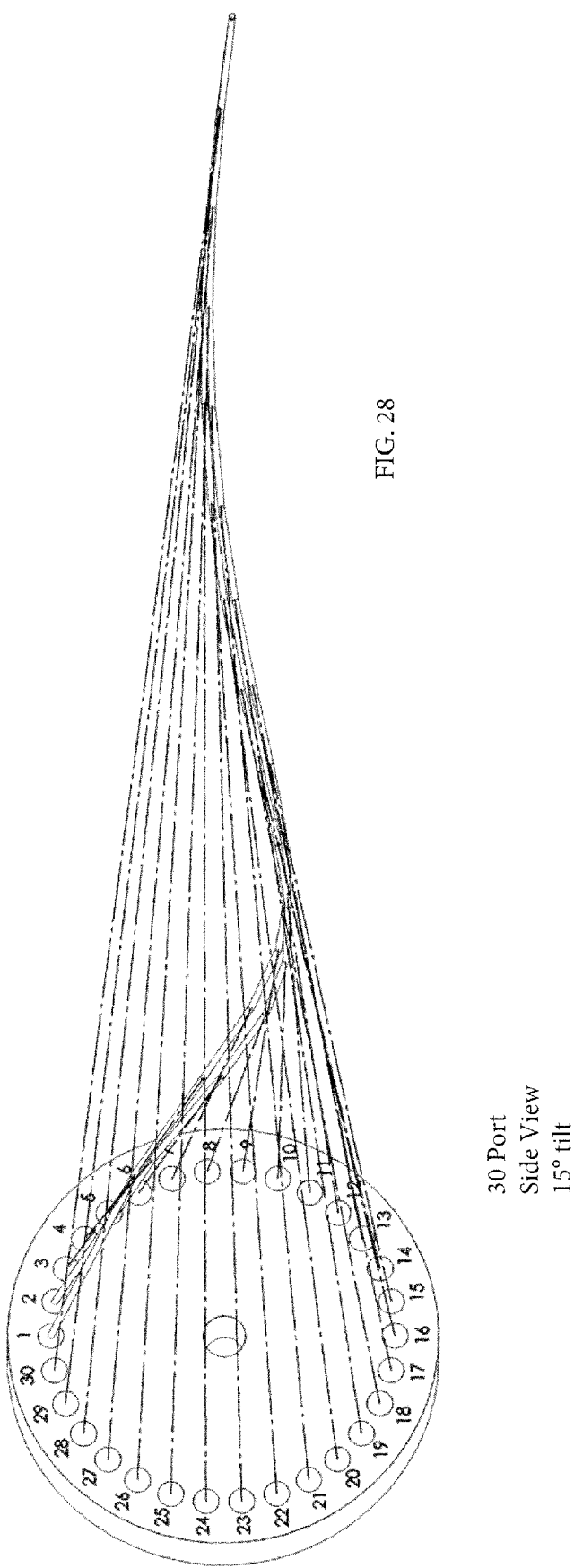

FIG. 28 is a representation of the side view with a 15 degree tilt of FIG. 25B.

Figure 29:
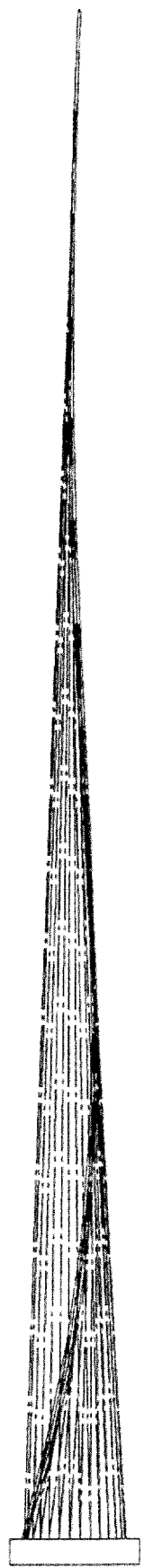

FIG. 29 is the representation of the side view FIG. 25B with no tilt.

FIGS. 30A and 30B are a representation of a 20 port embodiment where 4 extended segmented filaments will be propagated. Filament A will be propagated by laser ports A1-5, filament B by ports B1-5, filament C by ports C1-5 and filament D by ports D1-5. FIG. 30A is a representation, in this enlarged scale, of the coordinates of the ports and the distance Z of the segment initiation. FIG. 30B is a representation of the CW lasers and the KSF segments for a particular ensemble using four grouping of five laser ports.

Figure 31:
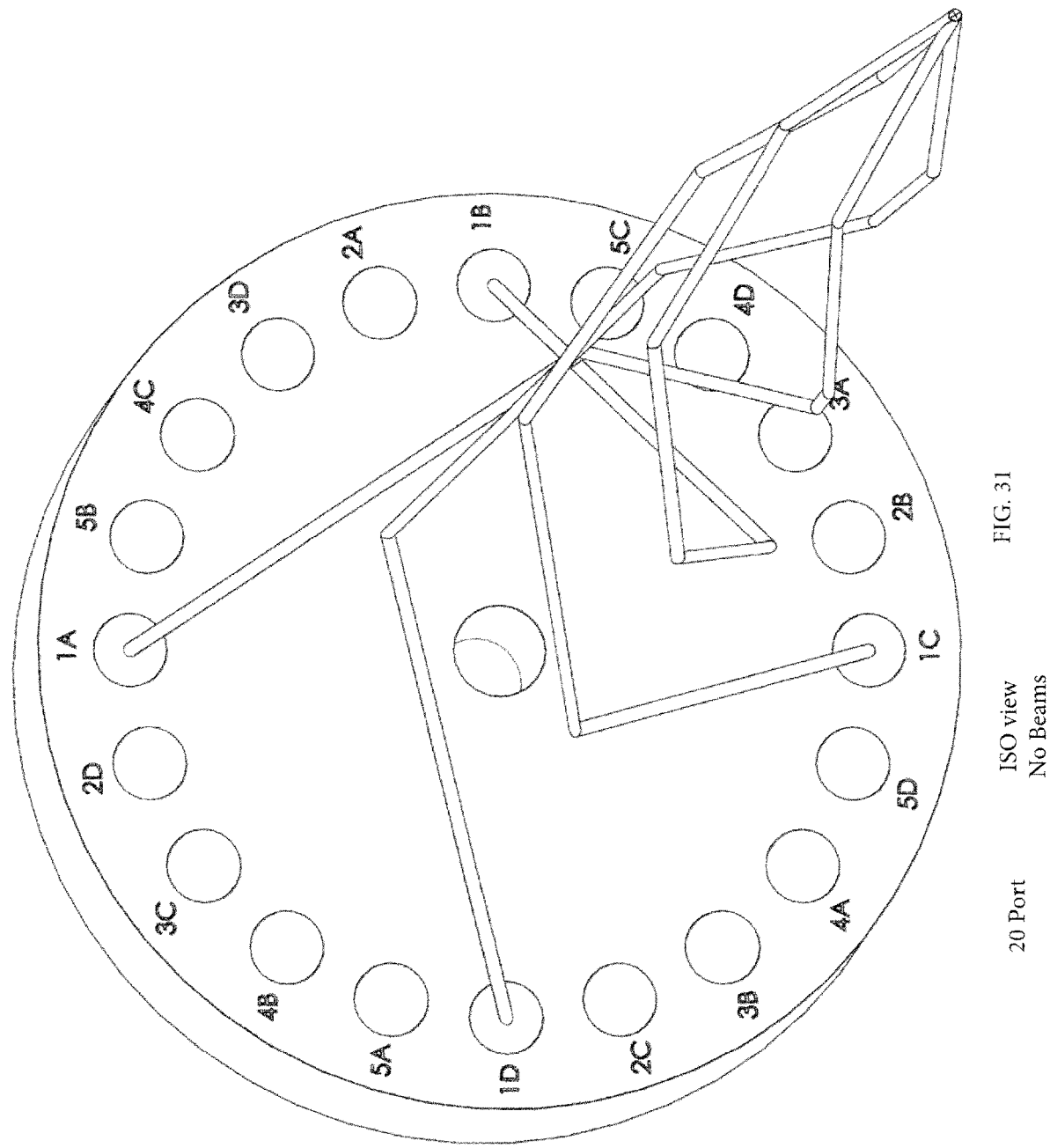

FIG. 31 is a different angle view of FIG. 30B where the CW laser paths are not shown.

Figure 32:
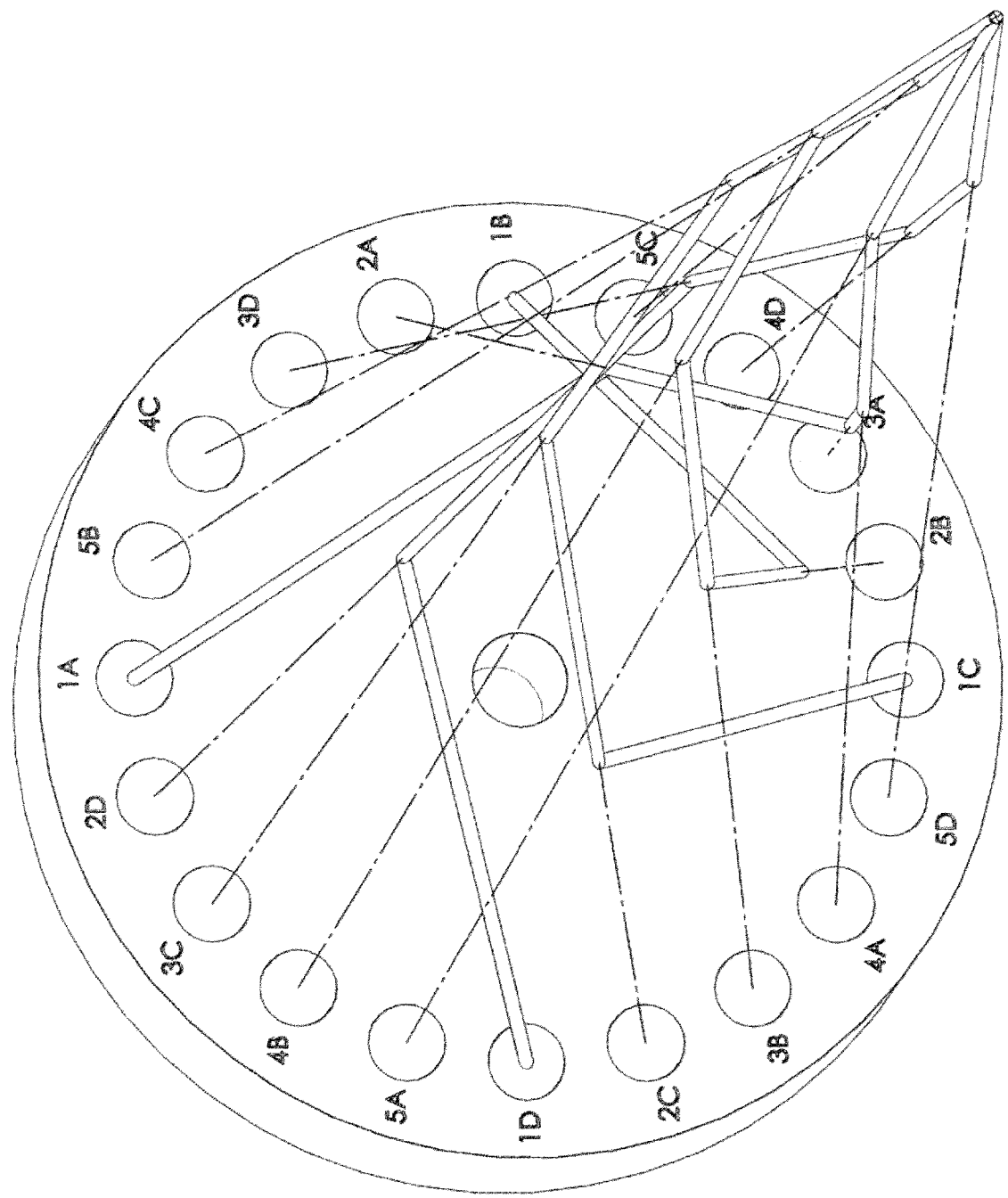

FIG. 32 is the same as FIG. 31 where the CW laser paths are shown.

Figure 33:
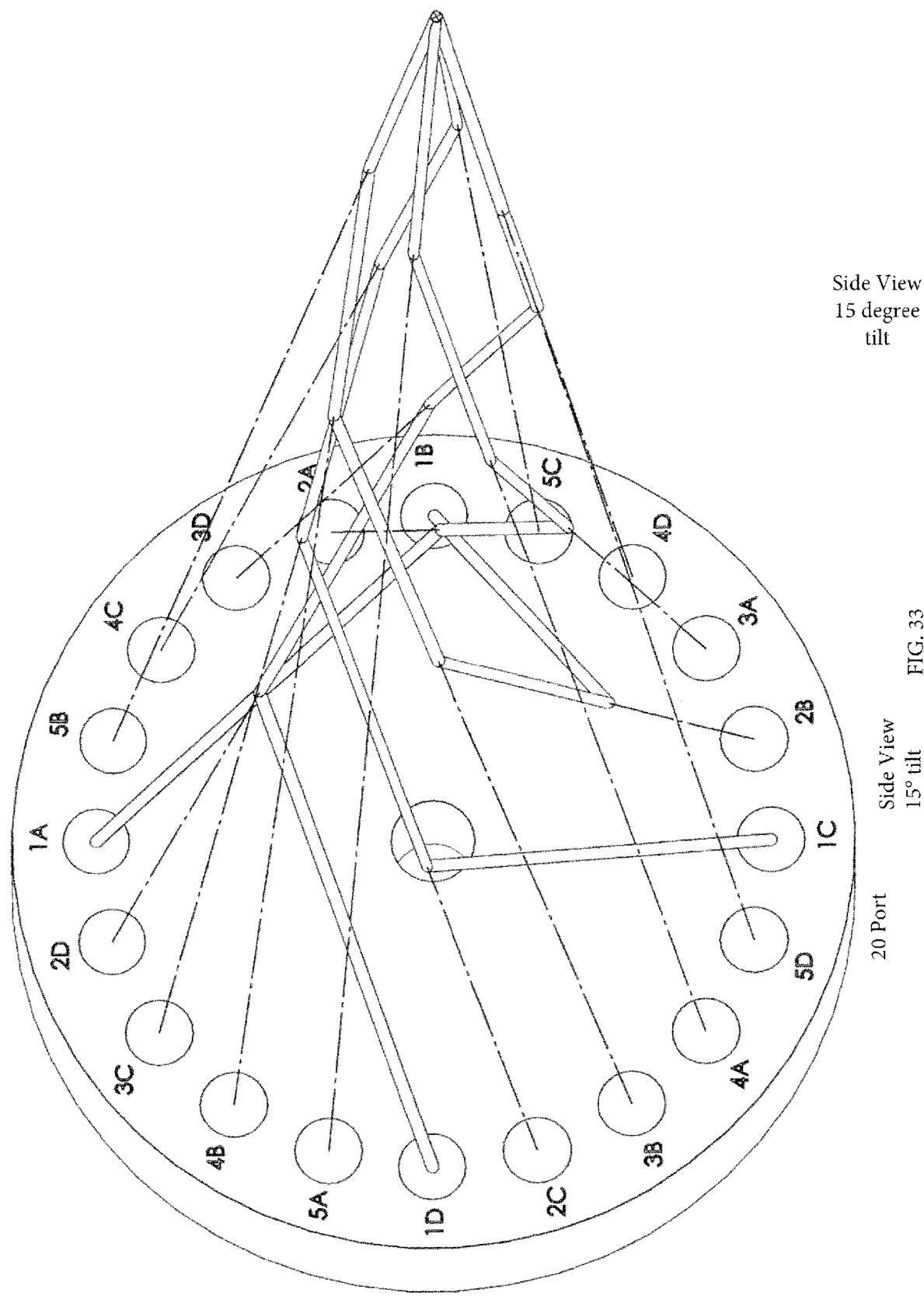

FIG. 33 is the same as FIG. 30B with the side view with a 15 degree tilt.

Figure 34:
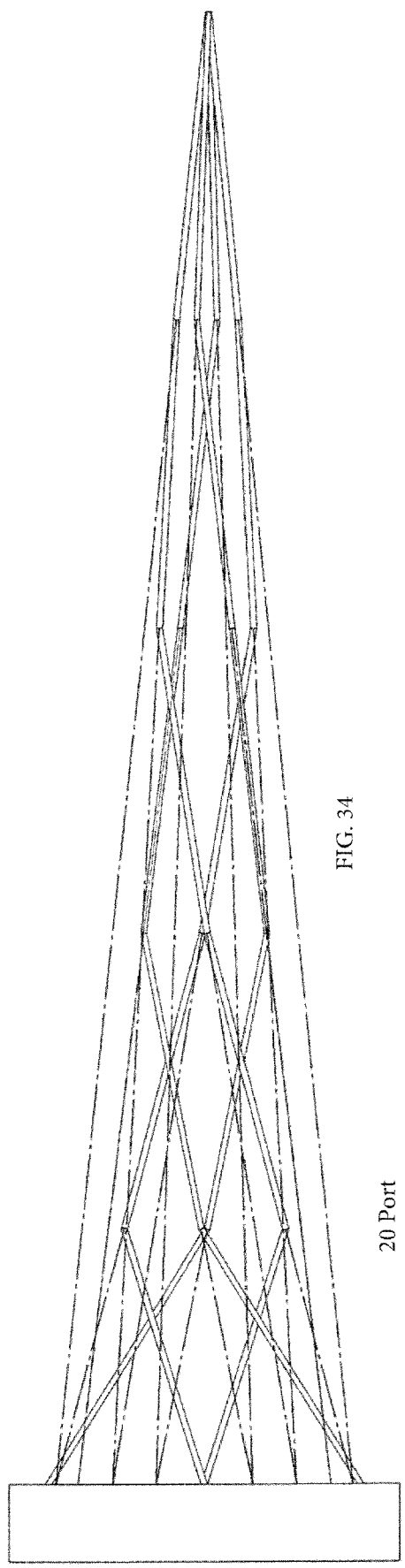
Figure 35:
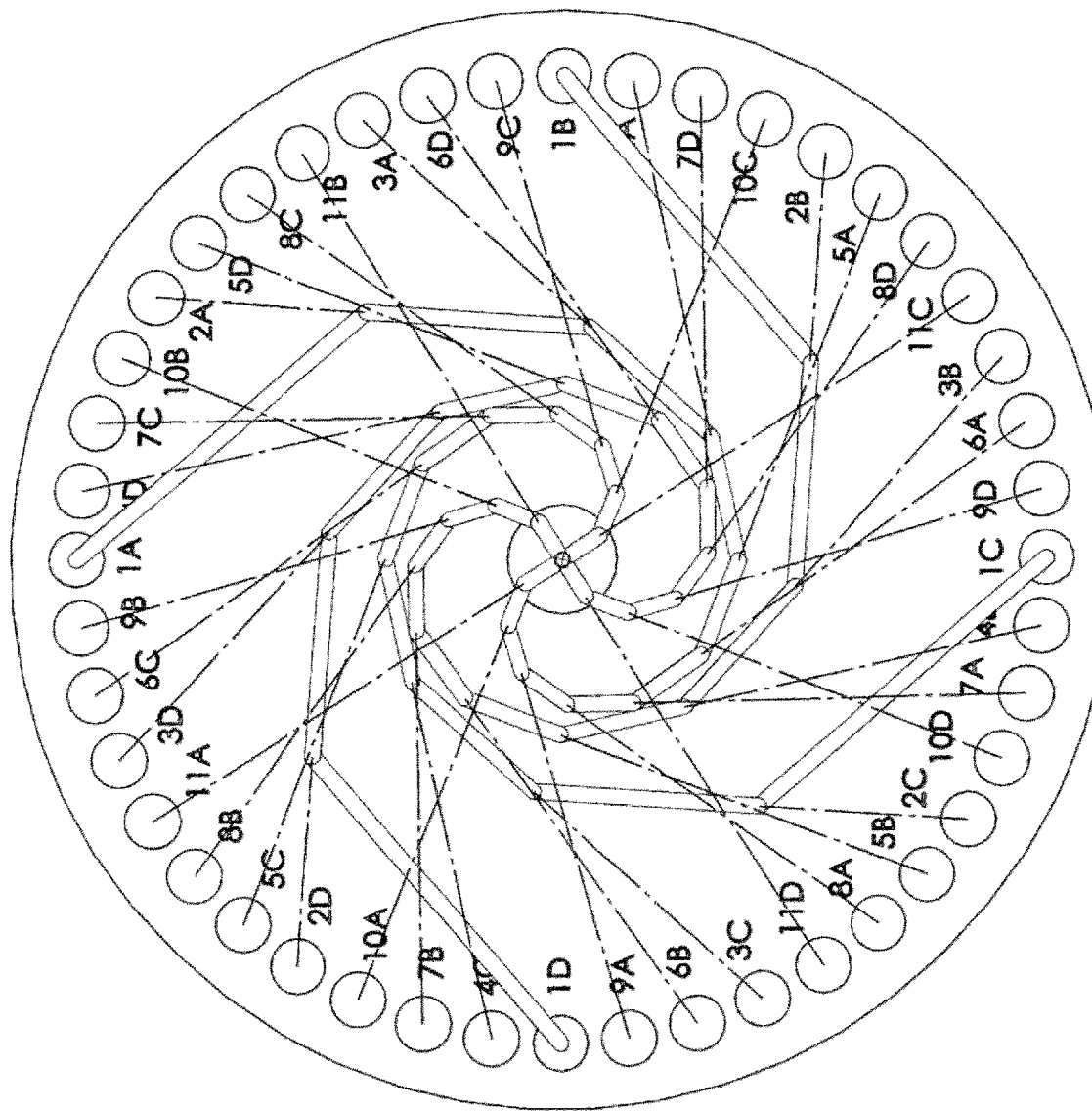
Figure 36:
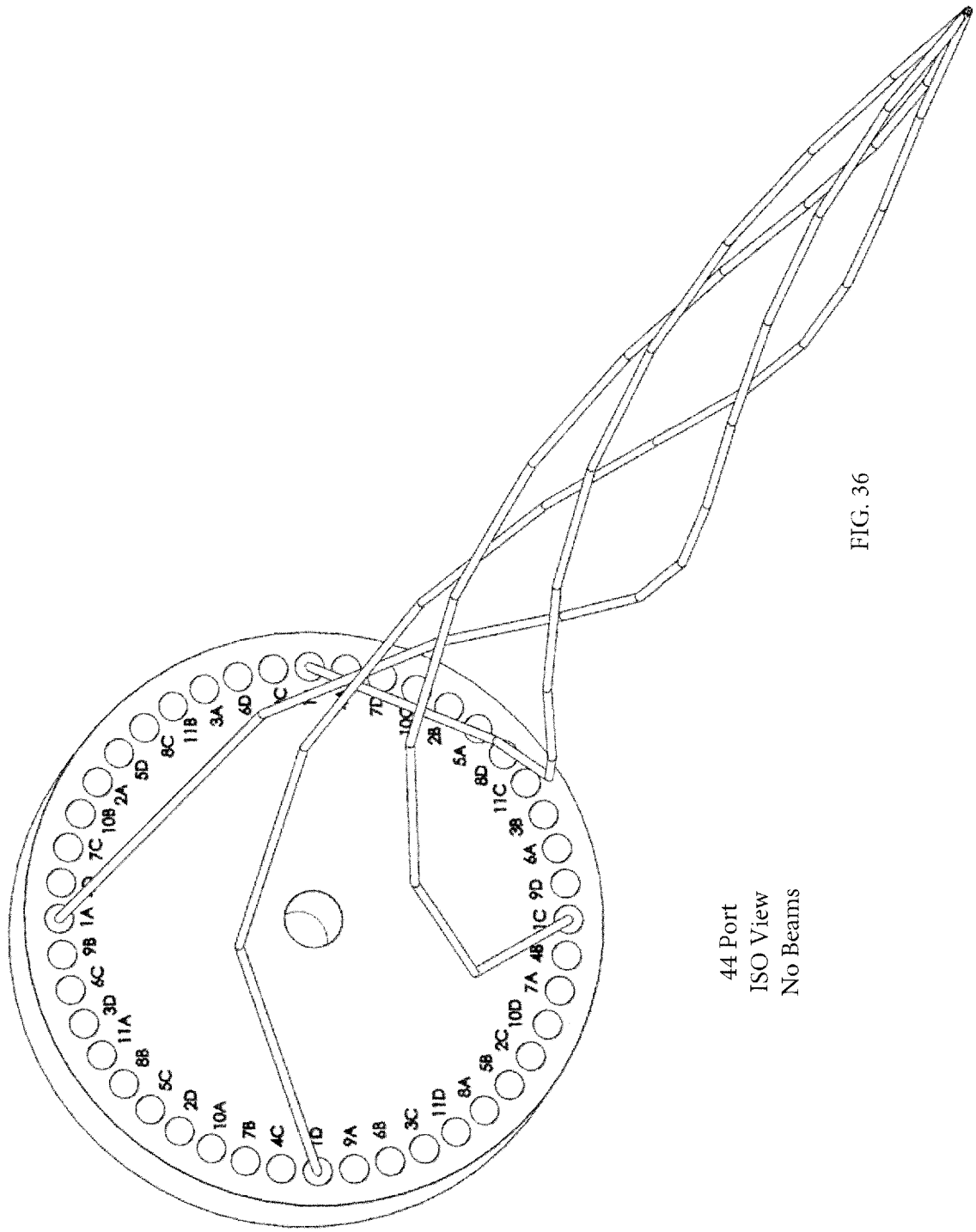
Figure 37:
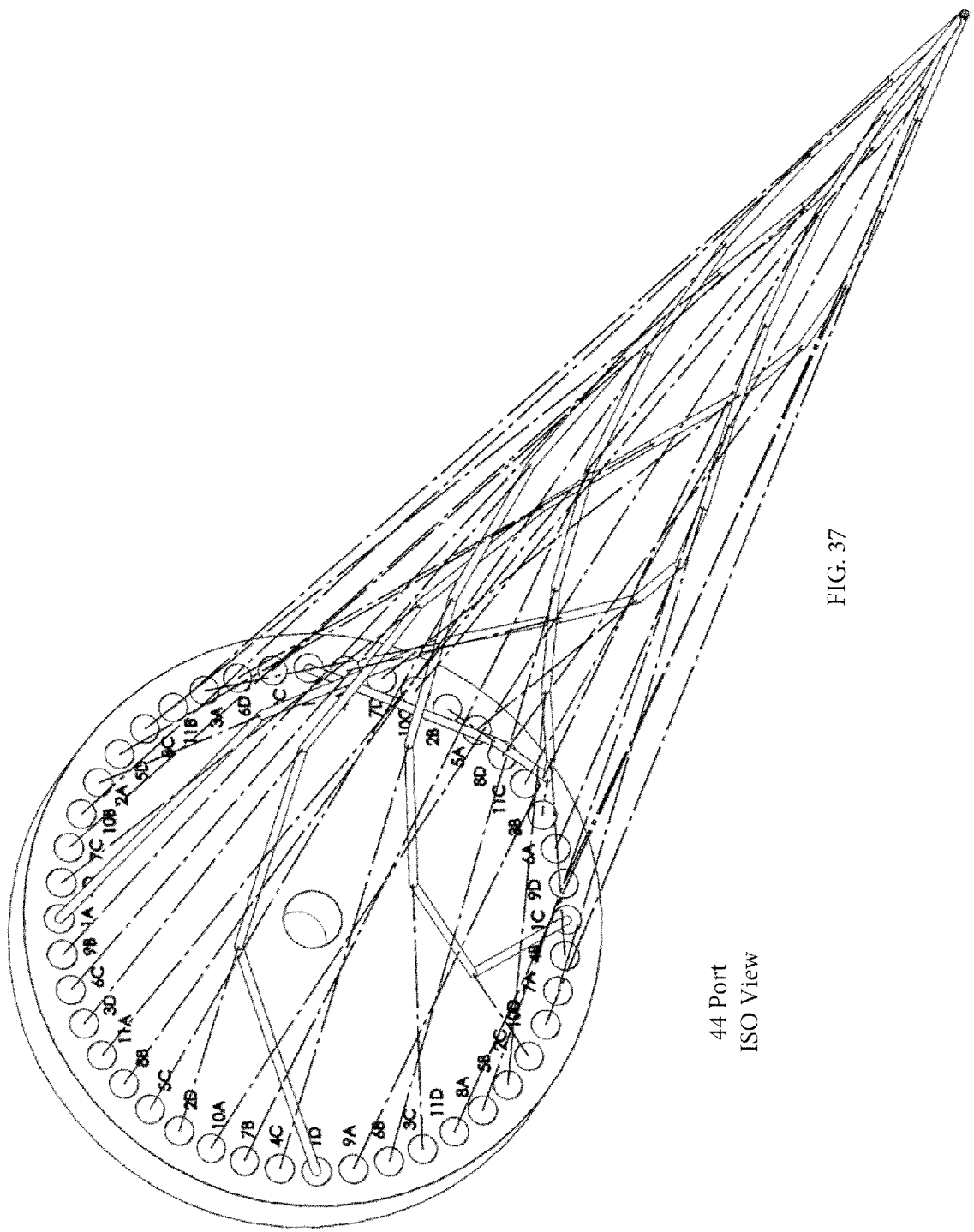
Figure 38:
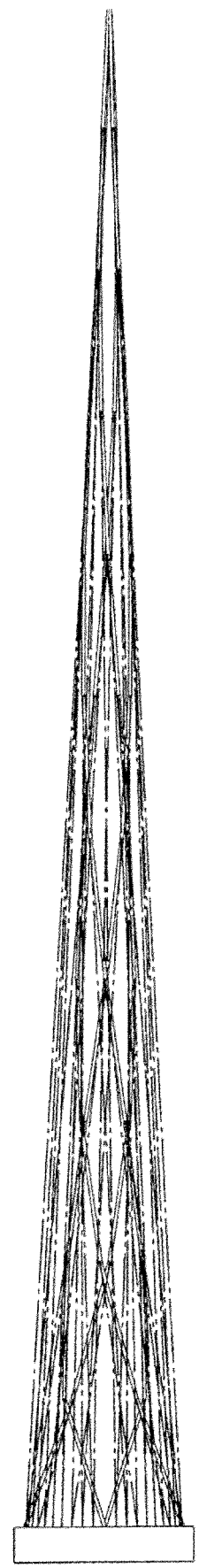
Figure 39B:
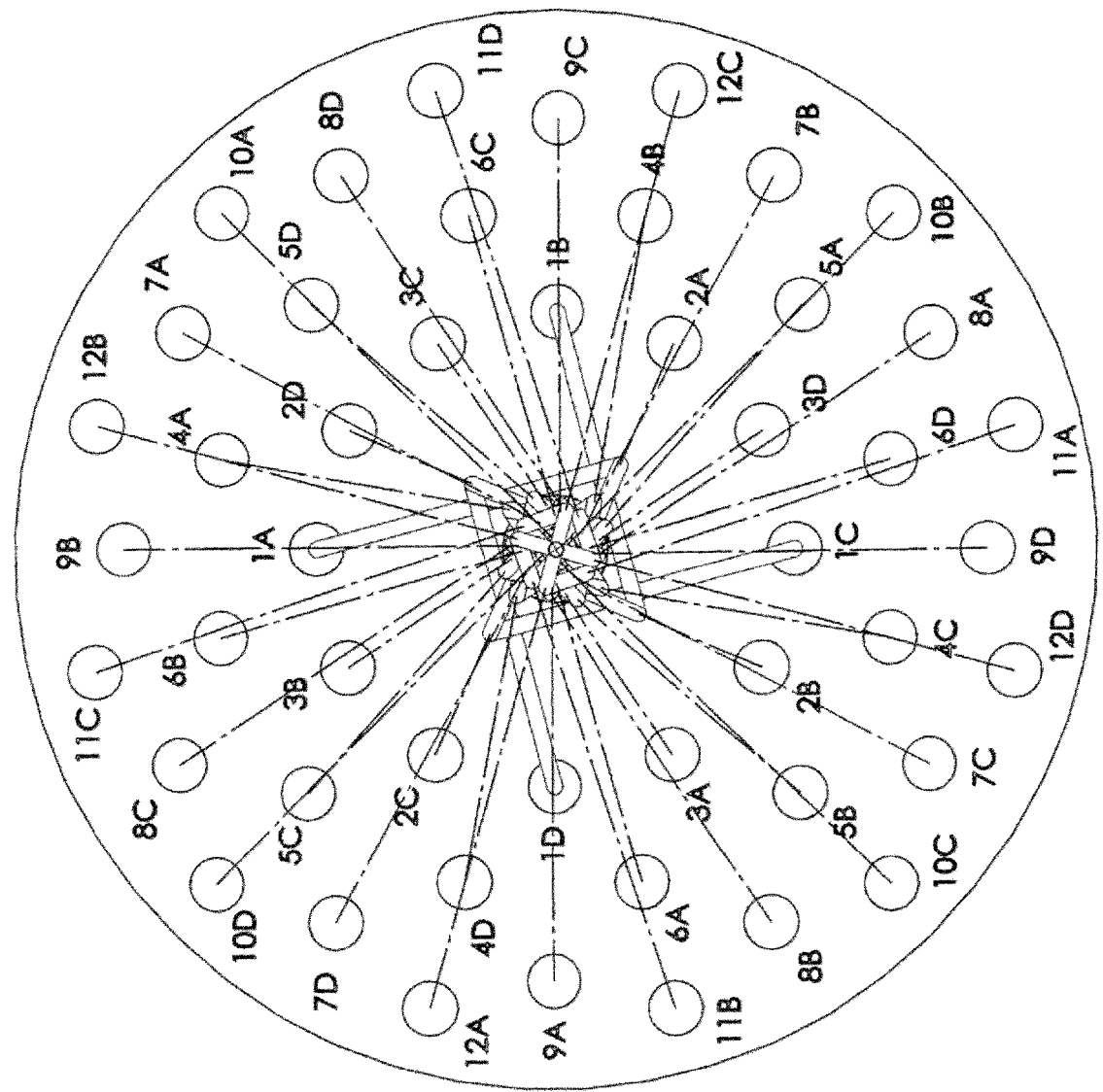
Figure 40:
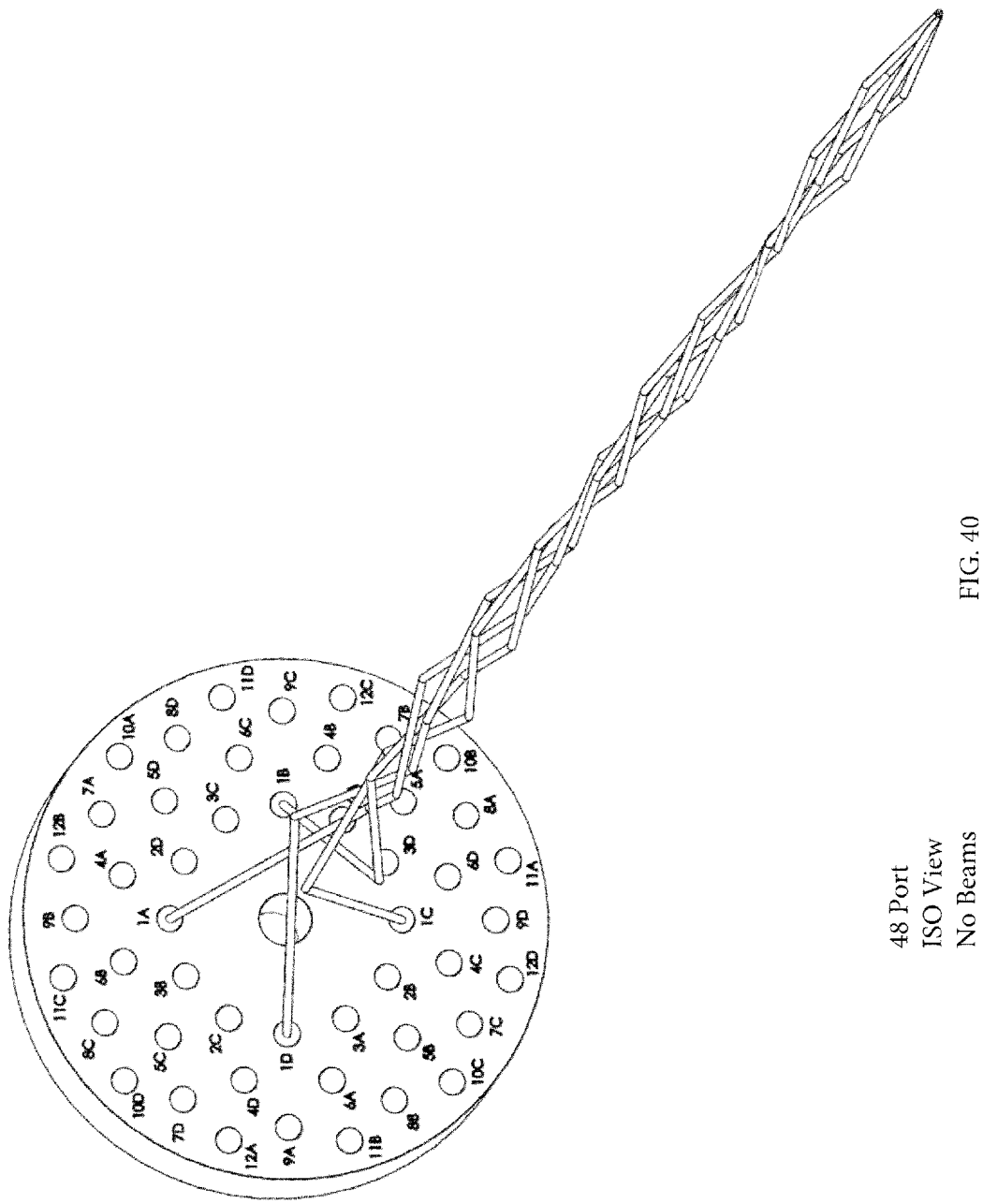
Figure 41:
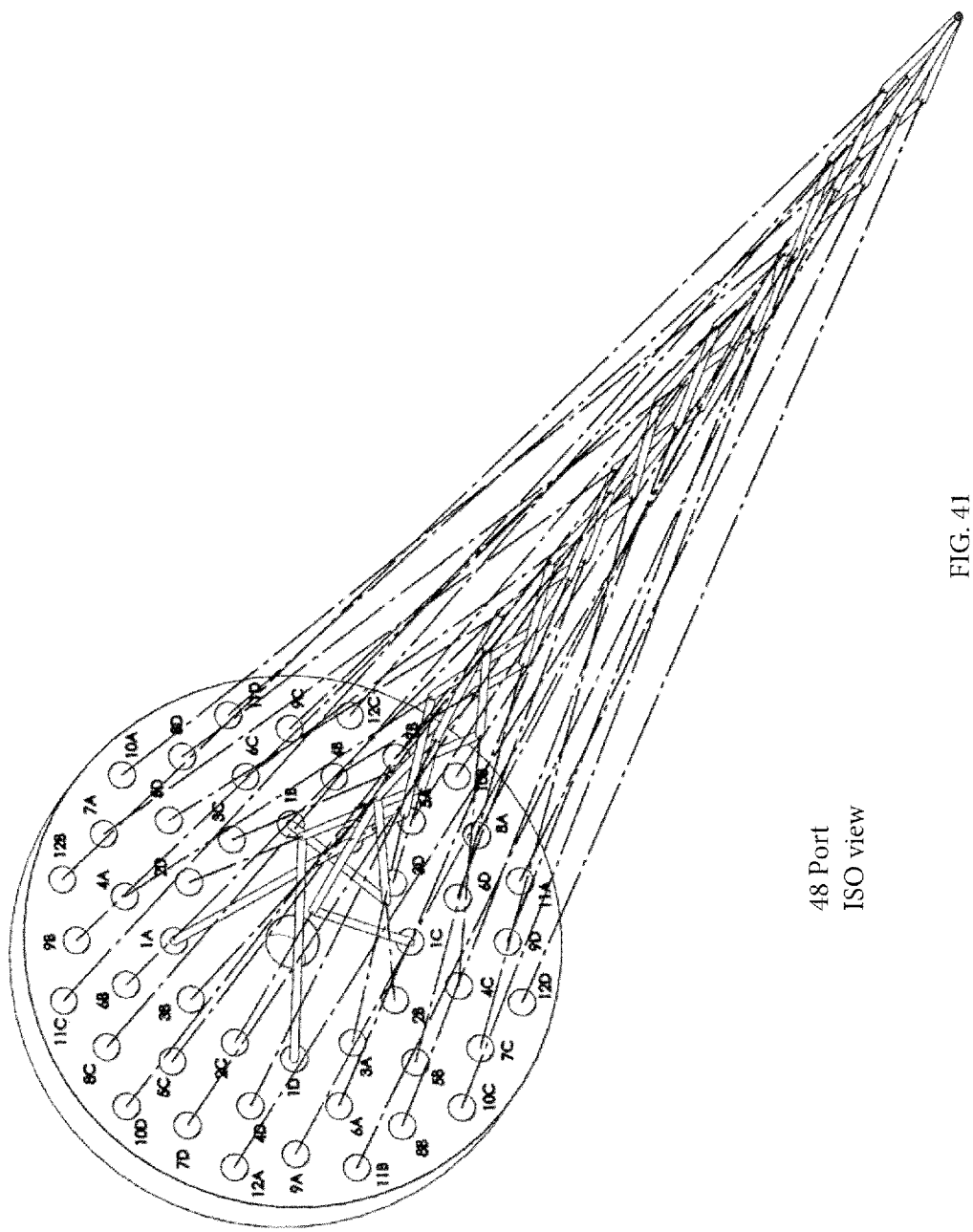
Figure 42:
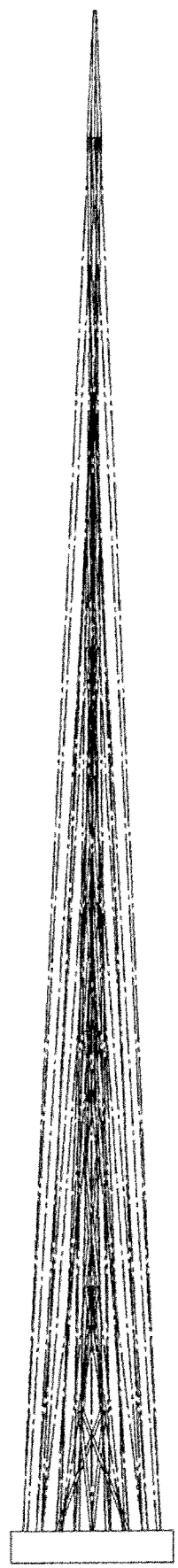

FIG. 34 is the same as FIG. 30B seen from the side.

FIGS. 35A and 35B-38 are representative of the same concept of FIGS. 30A and 30B. Four extended segmented filaments will be propagated, this time by a 44 laser port, single ring ensemble.

FIGS. 39A and 39B-42 are representative of the same concept of FIGS. 35A and 35B. This time, four extended segmented filaments will be propagated by 48 laser ports in three rings. As may be appreciated, any number of filament configurations can be accommodated by the present design. Super conductors may exhibit a lattice-like structure.

FIG. 43 is a block representation of a ball electrode on a retractable arm. The ball itself represents a hot ultra-high voltage power supply. Everything else around the ball is highly insulated. In this example, laser port 1 fires the initial filament segment through the hole in the ball electrode. That filament is a conductor which intersects with conducting filaments from other ports.

As to FIG. 44, is a representation of the present invention as both a sending station and a receiving station. Both the sending and receiving station establish the CW lasers, with sensors in both stations to analyze the beam intersections prior to the shots of the KSF. The control system analyzes the data to determine the time for the atomic clocks in both stations to fire. Both stations fire the KSF lasers at the same time to establish a conductive filament matrix or lattice to send energy between the stations.

As to FIG. 45, the representative retractable arms 122, 124 126 can be dedicated to any single or all of the ports to serve as ball electrodes, sensors or other uses.

FIG. 46 is representative of charging a target.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

REFERENCES

1. Braun, A. et al., "Self-channeling of high-peak-power femtosecond laser pulses in air," *Optics Letters,* 1995, 20:73-75.
2. Scheller, M. et al., "Externally refuelled optical filaments," *Nature Photonics,* 2014, 8:297-301.
3. Jeon, C. et al., "Laser Induced Filament Propagation Through Adverse Conditions," Propagation Through and Characterization of Atmospheric and Oceanic Filaments, Washington, D.C., June 2016.
4. Steinmeyer, G. et al., "Extending filamentation," *Nature Photonics,* 2014, 8:271-273.
5. CREOL, The College of Optics & Photonics, http://www.creol.ucf.edu/Research Highlights/2015/Optical-MultiFilamentEngineering.aspx.
6. Sincore, A. et al., "Beam propagation of Gaussian and annular beams at 2 µm in the presence of thermal lensing," Conference on Lasers and Electro-Optics, San Jose, Calif., June 2016.
7. Breyer, A., "Making Weather with High-Power Laser Beams," Aug. 1, 2016, http://www.novuslight.com/making-weather-with-high-power-laser-beams_N5852.html.
8. Schmitt-Sody, A. et al., "Picosecond laser filamentation in air," *New Journal of Physics,* 2016, 18:093005.
9. Schmitt-Sody, A. et al., "Dependence of single-shot pulse durations on near-infrared filamentation-guided breakdown in air," *Air Advances,* 2017, 7:035018.
10. Houard, A. et al., "Study of filamentation with a high power high repetition rate ps laser at 1.03 µm," *Optics Express,* 2016, 24(7):7437-7448.

The invention claimed is:

1. A system for creating an ionized conductive path in a medium, comprising:
   a plurality of ionizing lasers,
   wherein each ionizing laser creates a corresponding ionizing beam that creates a corresponding filament at a corresponding location and orientation in the medium, where the filament forms a segment of an ionized conductive path, and
   wherein the plurality of locations and orientations of the resulting plurality of filaments in the medium are such that the resulting plurality of filaments interconnect to form the ionized conductive path in the medium,
   a first laser beam from a first ionizing laser creates a first ionizing beam segment transmitted along a first path that allows for the creation of the corresponding first segment of the ionized conductive path in a first location such that the plurality of segments of the ionized conductive path create the ionized conductive path, and
   a second laser beam from a second ionizing laser creates a second ionizing beam segment transmitted along a second path so as to intersect the first path of the first ionizing beam at a first intersection point, such that the first segment of the first ionizing beam, from a location where the filamentation of the first ionizing beam is initiated, to the first intersection point, serves as a first segment of the conductive path,
   wherein the second ionizing beam intersects the first ionizing beam in a manner that the charge traveling along the first segment of the conductive path transfers to the second segment of the conductive path.

2. The system accordingly to claim 1, wherein the plurality of ionizing lasers are high power, ultra-fast pulsed, "Kerr", non-linear lasers.

3. The system accordingly to claim 1,
wherein the second segment of the conductive path extends from the first intersection point to a second intersection point, where the third ionizing beam intersects the second ionizing beam and the charge traveling in the second segment of the conductive path transfers to the third segment of the conductive path.

4. The system accordingly to claim 3,
wherein, for a conductive path made up of n conductive path segments, where n is greater than 3, this process continues until the $n^{th}$ segment of the conductive path is created, and the charge from the $(n-1)^{th}$ segment of the conductive path transfers to the $n^{th}$ segment of the conductive path.

5. The system accordingly to claim 1,
wherein a first ionizing beam of a first ionizing laser is surrounded by a corresponding dressing beam.

6. The system accordingly to claim 1,
wherein the plurality of ionizing lasers are fired in a timing sequence.

7. The system accordingly to claim 1,
wherein the plurality of ionizing lasers are fired simultaneously.

8. The system accordingly to claim 1,
wherein the plurality of ionizing lasers are fired from a ring of ports.

9. The system accordingly to claim 1,
wherein at least one ionizing laser of the plurality of ionizing lasers is configured to rotate, and/or to move laterally.

10. The system accordingly to claim 1,
wherein the plurality of ionizing lasers are fired from a linear array of laser ports.

11. The system accordingly to claim 10,
wherein a first beam at one end of the linear array of laser ports forms the first filament, and each successive adjacent beam can be used to form the next segment, all the way to the other end of the array, such that the interconnected segments form an arc shape.

12. The system accordingly to claim 1,
wherein the plurality of ionizing lasers are fired from a circular array of beams.

13. The system accordingly to claim 12,
wherein the interconnected filaments formed by the circular array of beams, using each successive adjacent beam to form the next filament, has a helical shape.

14. A system for transmission of charged particles along an ionized conductive path in a medium, comprising:
a system for creating an ionized conductive path in a medium, wherein the system for creating an ionized conductive path in the medium comprises:
a plurality of ionizing lasers,
wherein each ionizing laser creates a corresponding ionizing beam that creates a corresponding filament at a corresponding location and orientation in the medium, where the filament forms a segment of an ionized conductive path, and
wherein the plurality of locations and orientations of the resulting plurality of filaments in the medium are such that the resulting plurality of filaments interconnect to form the ionized conductive path in the medium;
a first laser beam from a first ionizing laser creates a first ionizing beam segment transmitted along a first path that allows for the creation of the corresponding first segment of the ionized conductive path in a first location such that the plurality of segments of the ionized conductive path create the ionized conductive path, and
a second laser beam from a second ionizing laser creates a second ionizing beam segment transmitted along a second path so as to intersect the first path of the first ionizing beam at a first intersection point, such that the first segment of the first ionizing beam, from a location where the filamentation of the first ionizing beam is initiated, to the first intersection point, serves as a first segment of the conductive path,
wherein the second ionizing beam intersects the first ionizing beam in a manner that the charge traveling along the first segment of the conductive path transfers to the second segment of the conductive path;
an energy source,
wherein the energy source is a source of electrically charged particles capable of supplying electrically charged particles into the conductive path; and
an electrode,
wherein the electrode introduces the electrically charged particles into the conductive path.

15. The system accordingly to claim 14,
wherein the electrically charged particles flow from a power source to a remote target.

16. The system accordingly to claim 14, further comprising:
a plurality of charging rods to introduce electrically charged particles the corresponding plurality of conductive paths.

17. The system accordingly to claim 16, further comprising:
a control system, and
a power source,
wherein the plurality of charging rods, the control system, and the power source are all electrically connected.

18. The system according to claim 14,
wherein the second segment of the conductive path extends from the first intersection point to a second intersection point, where the third ionizing beam intersects the second ionizing beam and the charge traveling in the second segment of the conductive path transfers to the third segment of the conductive path.

19. A system for transmission of charged particles along an ionized conductive path in a medium, comprising:
a system for creating an ionized conductive path in a medium, wherein the system for creating an ionized conductive path in the medium comprises:
a plurality of ionizing lasers,
wherein each ionizing laser creates a corresponding ionizing beam that creates a corresponding filament at a corresponding location and orientation in the medium, where the filament forms a segment of an ionized conductive path, and
wherein the plurality of locations and orientations of the resulting plurality of filaments in the medium are such that the resulting plurality of filaments interconnect to form the ionized conductive path in the medium;
an energy source,
wherein the energy source is a source of electrically charged particles capable of supplying electrically charged particles into the conductive path; and
an electrode,
wherein the electrode introduces the electrically charged particles into the conductive path, wherein the electrically charged particles flow from a power source to a remote target, wherein the remote target is a second ionized conductive path, such that the second ionized conductive path in the medium interconnects with the ionized conductive path in the medium wherein a receiver station comprises:

a second plurality of ionizing lasers, wherein each ionizing laser of the second plurality of ionizing lasers creates a corresponding ionizing beam that creates a corresponding filament at a corresponding location and orientation in the medium, where the filament forms a segment of the second ionized conductive path, and wherein the plurality of locations and orientations of the resulting plurality of filaments in the medium are such that the resulting plurality of filaments interconnect to form the second ionized conductive path in the medium, wherein, when the second ionized conductive path in the medium interconnects with the ionized conductive path in the medium, an integrated ionized conductive path in the medium is formed from the transmitter station having the power source and the receiver station.

20. A system for transmission of charged particles along an ionized conductive path in a medium, comprising:

a system for creating an ionized conductive path in a medium, wherein the system for creating an ionized conductive path in the medium comprises:

a plurality of ionizing lasers, wherein each ionizing laser creates a corresponding ionizing beam that creates a corresponding filament at a corresponding location and orientation in the medium, where the filament forms a segment of an ionized conductive path, and wherein the plurality of locations and orientations of the resulting plurality of filaments in the medium are such that the resulting plurality of filaments interconnect to form the ionized conductive path in the medium;

an energy source, wherein the energy source is a source of electrically charged particles capable of supplying electrically charged particles into the conductive path; and an electrode, wherein the electrode introduces the electrically charged particles into the conductive path, wherein the electrically charged particles flow from a power source to a remote target, a corresponding plurality of CW lasers, wherein each ionizing laser has an associated CW laser, such that the corresponding plurality of CW lasers emit CW beams and receive a corresponding plurality of reflected signals that provide information regarding the location of the CW beam paths of the other CW lasers, wherein orientations and positions of the ionizing laser-lasers are corrected until the CW laser beam paths intersect with the correct other CW beam paths, such that upon all the CW lasers are correctly oriented and positioned, and wherein the plurality of ionizing lasers are then simultaneously fired so as to create filaments at the correct distance out so as to form the ionized conductive path in the medium.

* * * * *